Dec. 22, 1953          R. C. ZEIDLER ET AL          2,663,149
           ROTARY TURBINE-TYPE HYDRAULIC TORQUE CONVERTER
Filed Dec. 30, 1950                          14 Sheets-Sheet 1
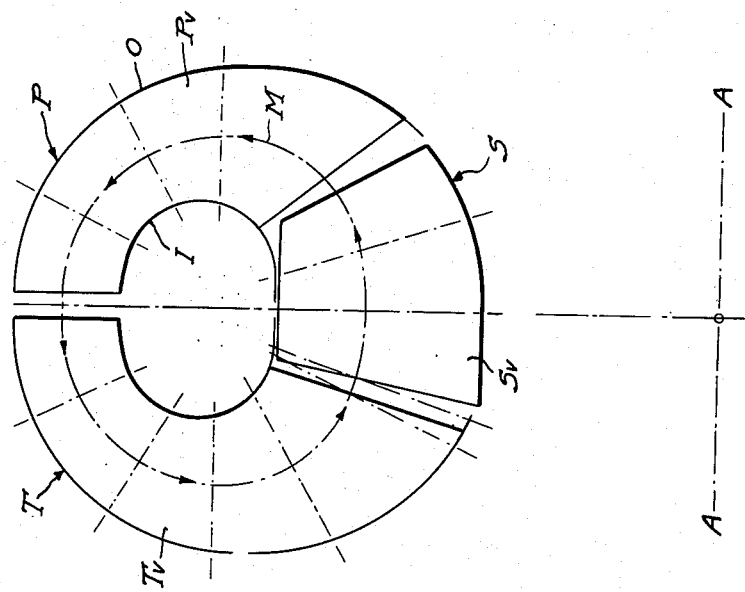
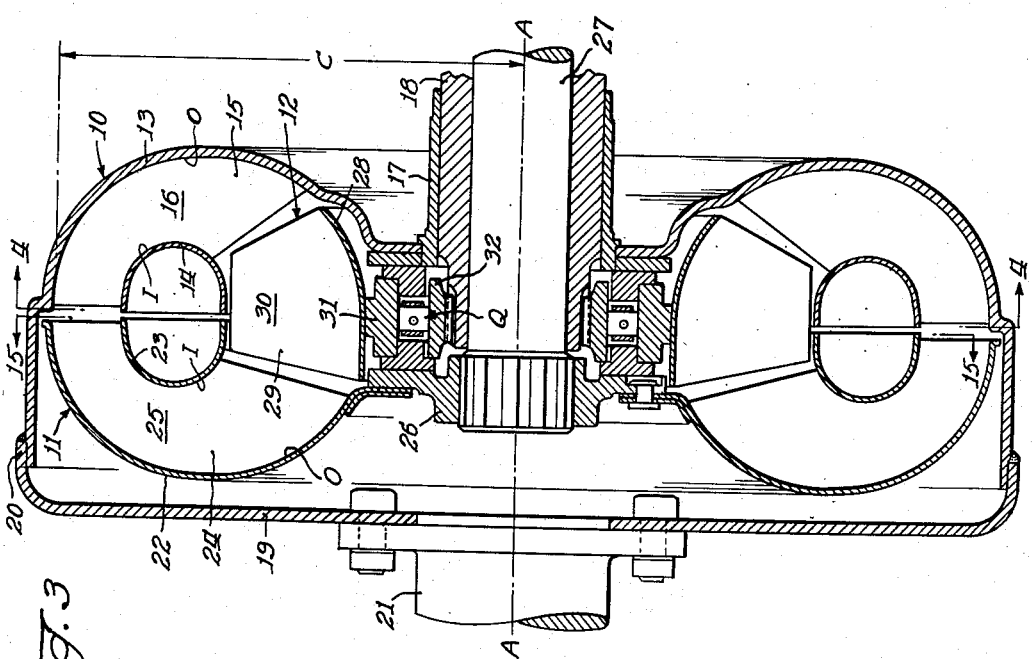
Inventors:
Reinhold C. Zeidler and
William A. Barnes
By: Edward C. Gritzbaugh
Atty.

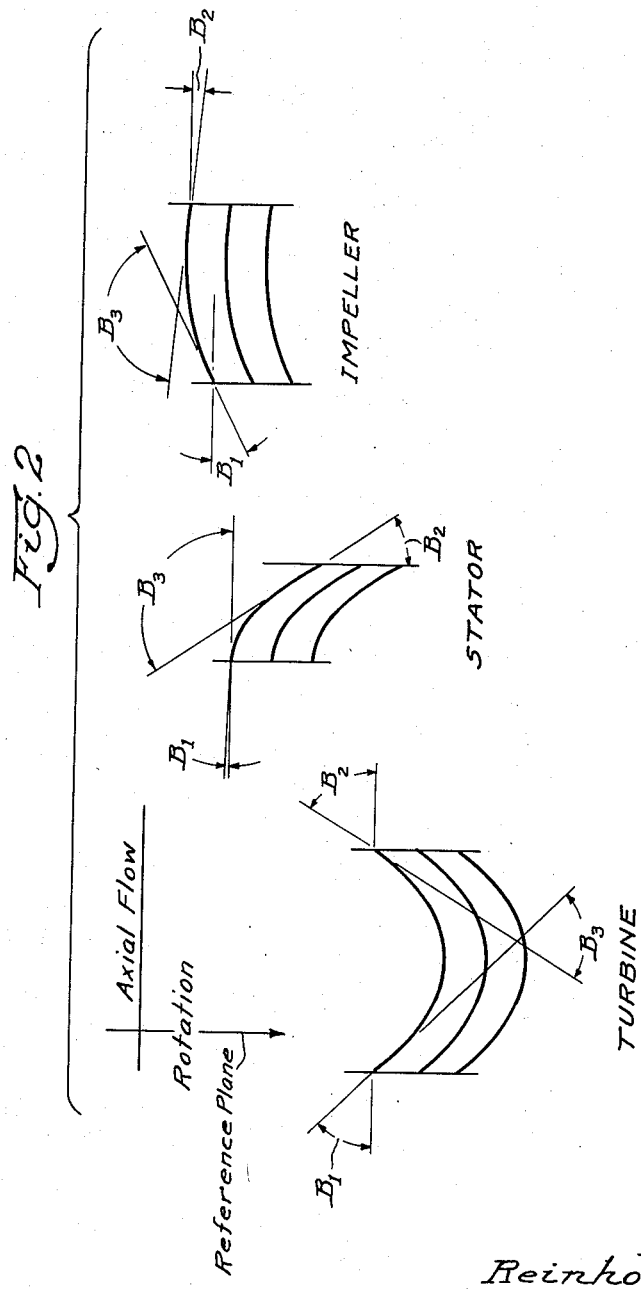

Dec. 22, 1953 R. C. ZEIDLER ET AL 2,663,149
ROTARY TURBINE-TYPE HYDRAULIC TORQUE CONVERTER
Filed Dec. 30, 1950 14 Sheets-Sheet 3
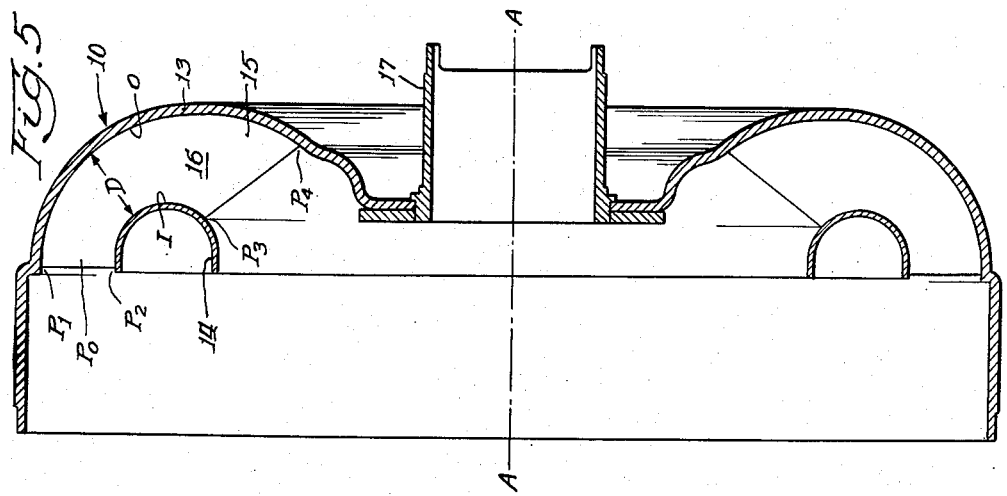
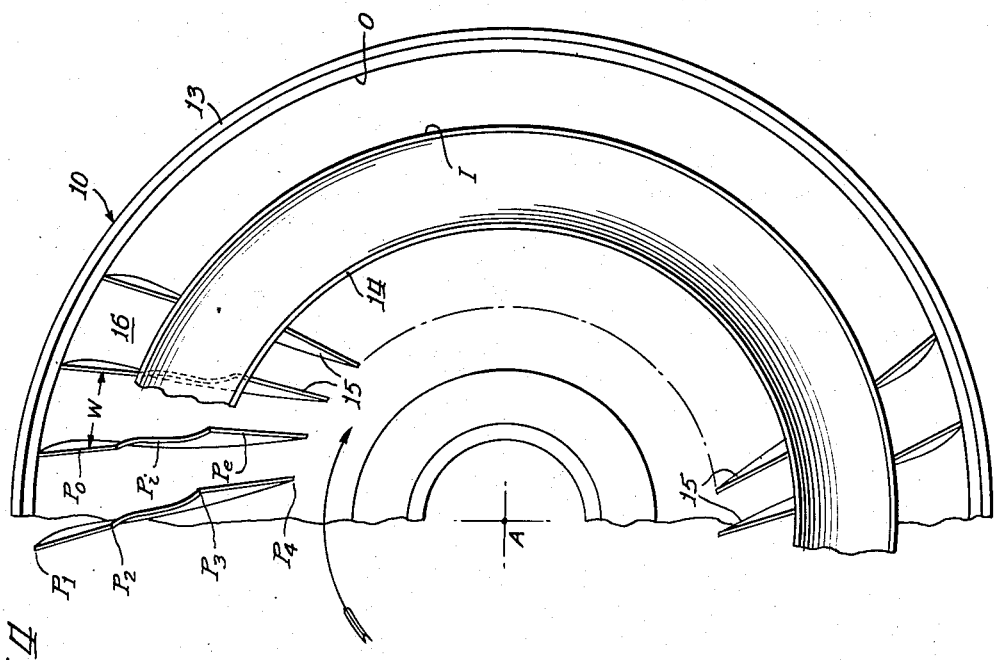
Inventors:
Reinhold C. Zeidler and
William A. Barnes
By: Edward C. Gritzbaugh
Atty.

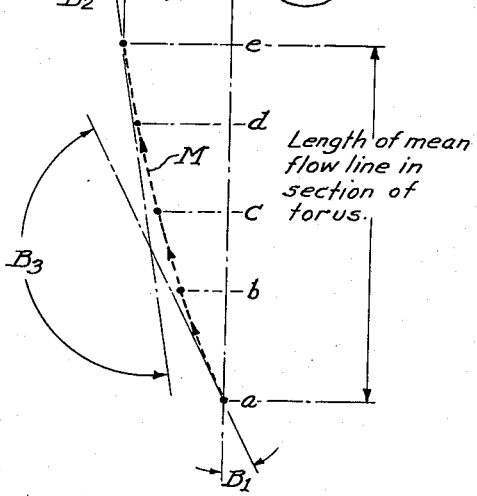

Dec. 22, 1953   R. C. ZEIDLER ET AL   2,663,149
ROTARY TURBINE-TYPE HYDRAULIC TORQUE CONVERTER
Filed Dec. 30, 1950   14 Sheets-Sheet 5
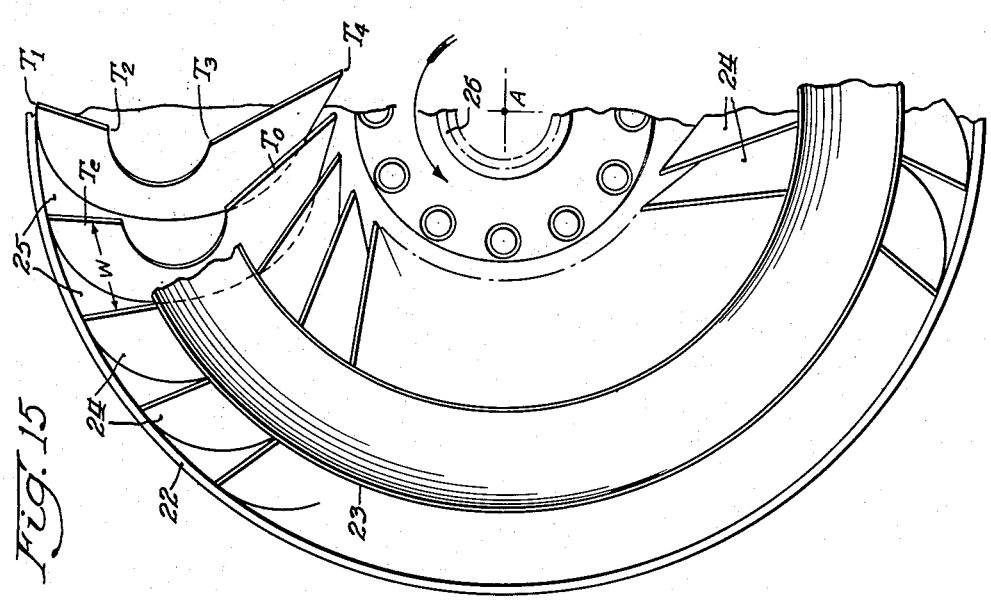
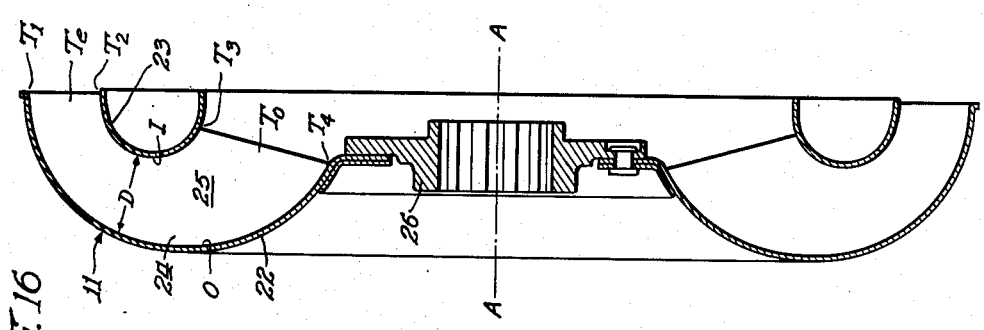
Inventors:
Reinhold C. Zeidler and
William A. Barnes
By: Edward C. Fitzbaugh
Atty.

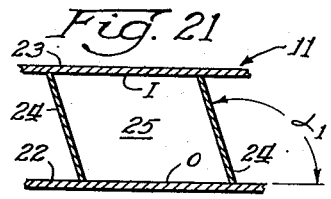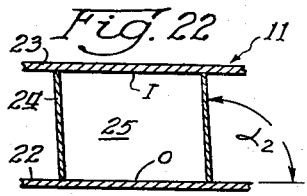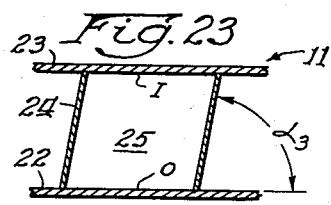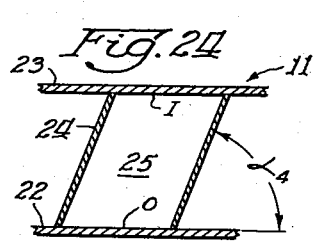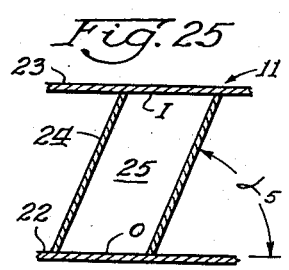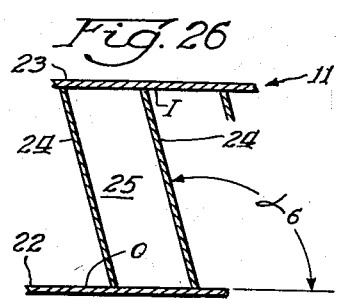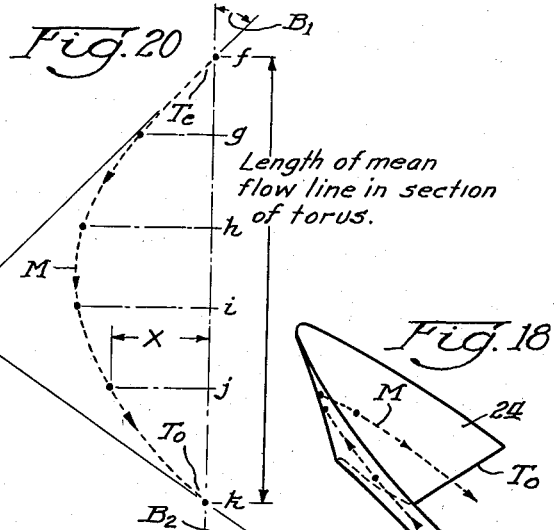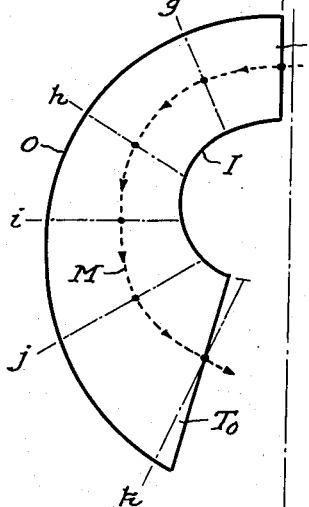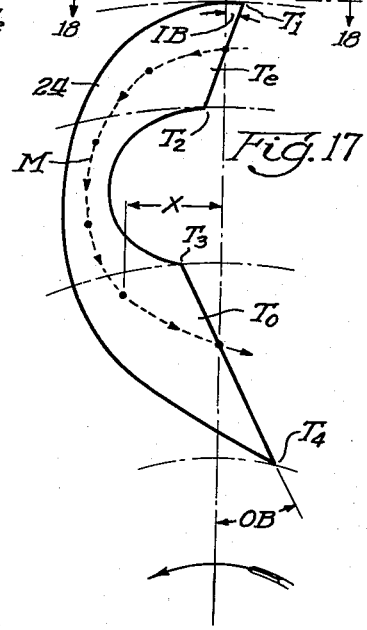

Inventors:
Reinhold C. Zeidler and
William A. Barnes
By: Edward C. Gitzbaugh
Atty.

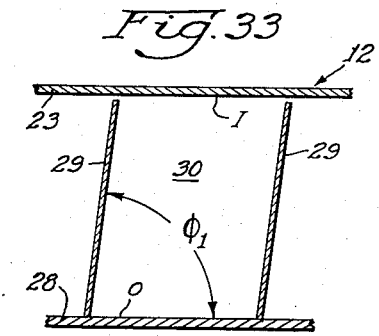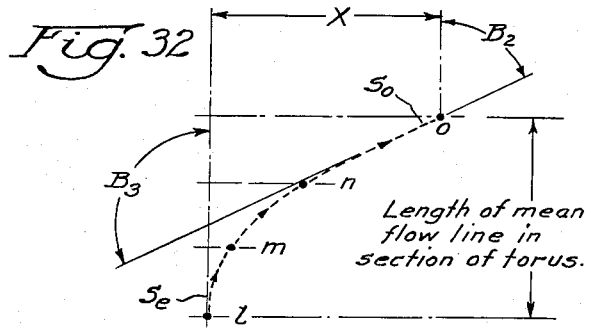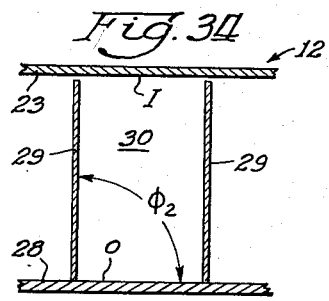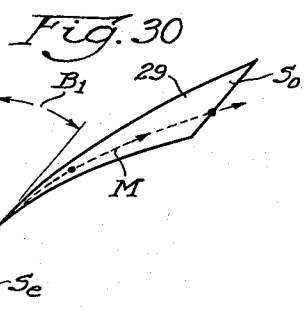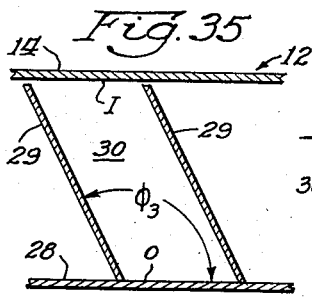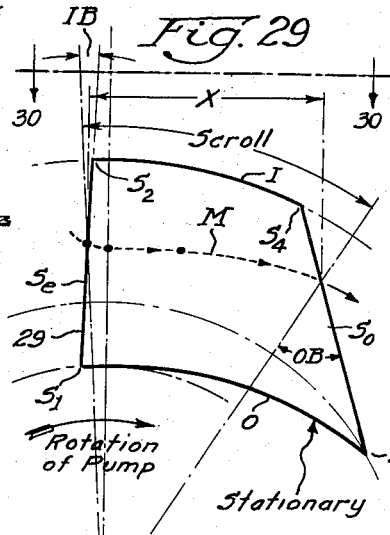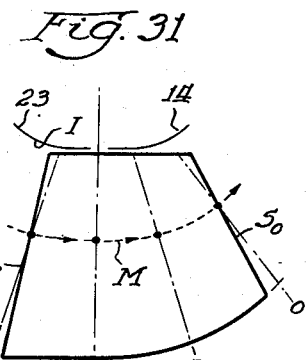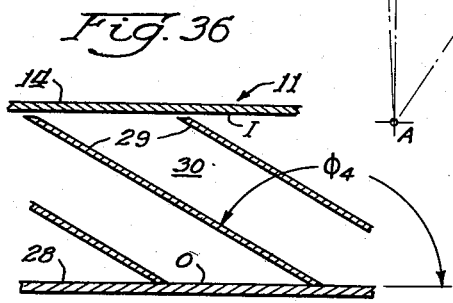

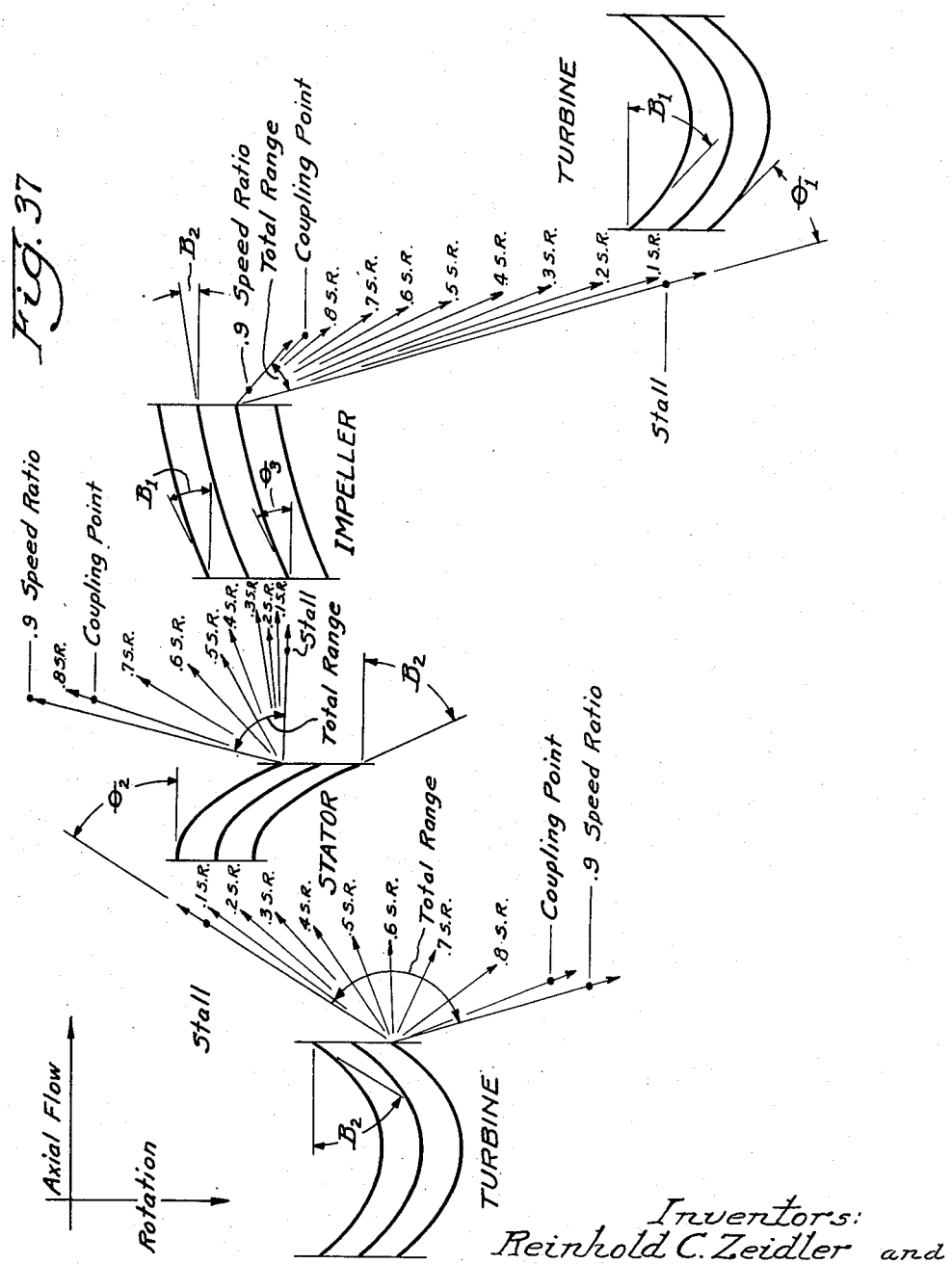

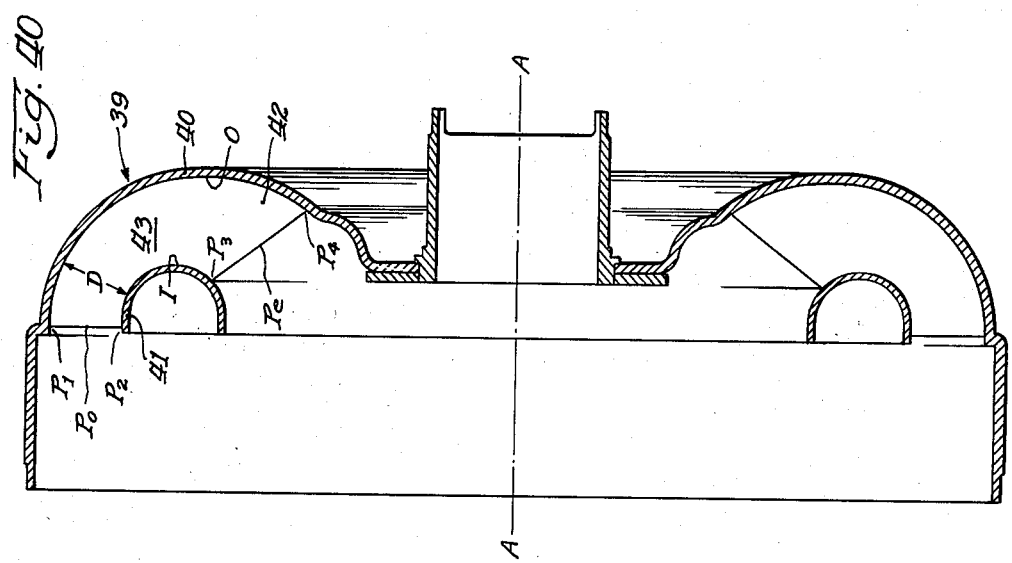
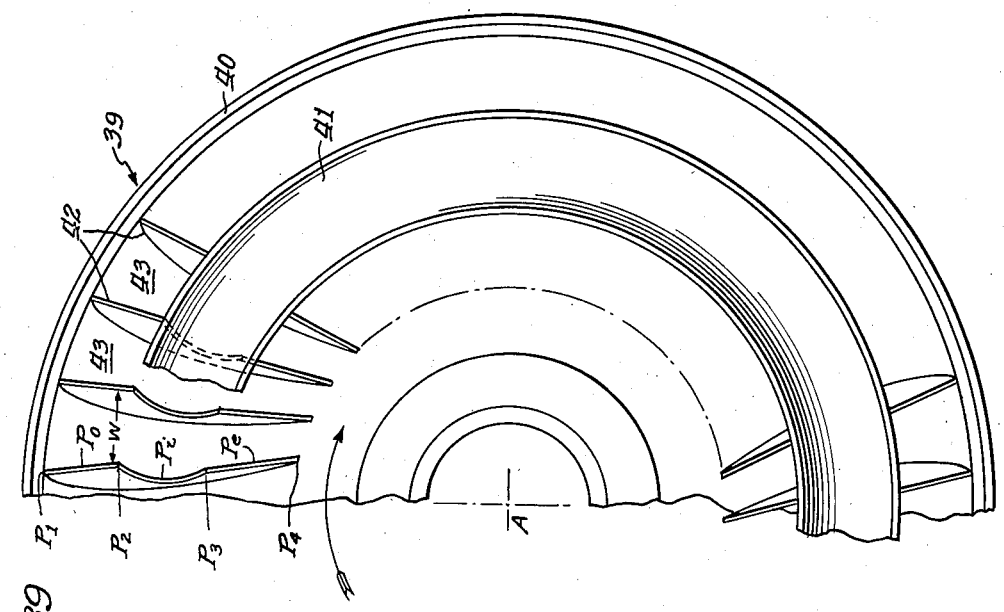

Dec. 22, 1953   R. C. ZEIDLER ET AL   2,663,149
ROTARY TURBINE-TYPE HYDRAULIC TORQUE CONVERTER
Filed Dec. 30, 1950   14 Sheets-Sheet 11
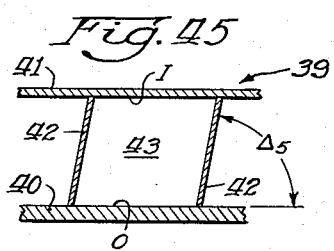
Fig. 45
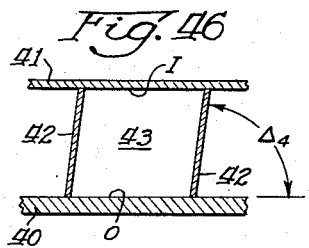
Fig. 46
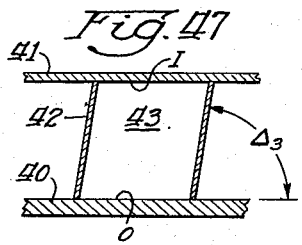
Fig. 47
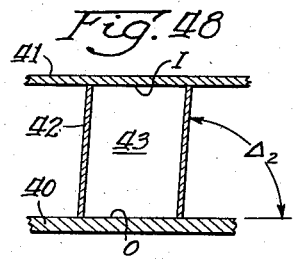
Fig. 48
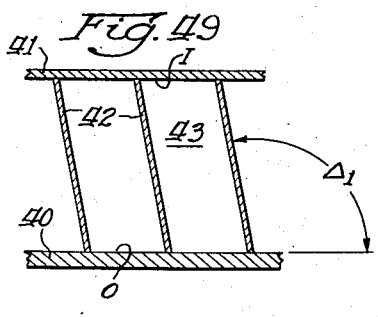
Fig. 49
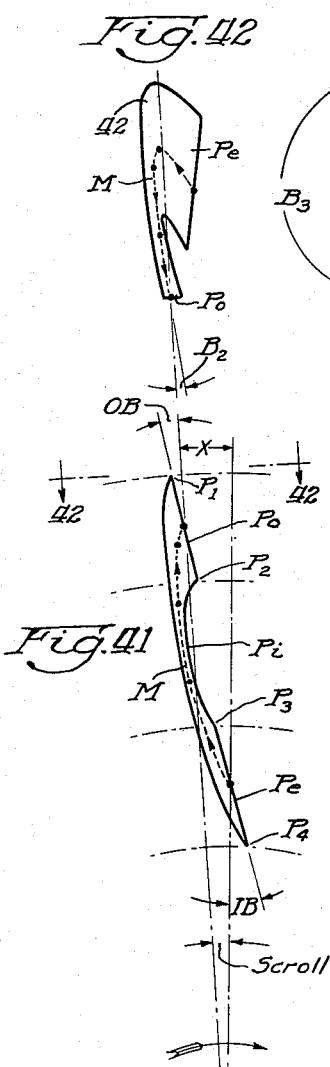
Fig. 42
Fig. 41
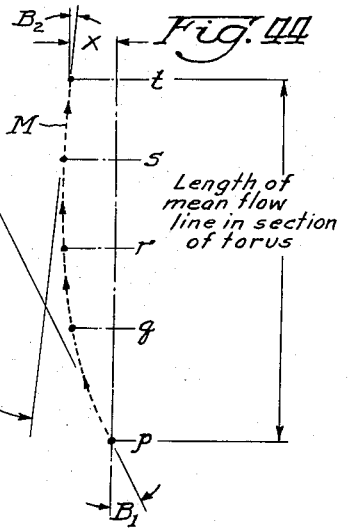
Fig. 44
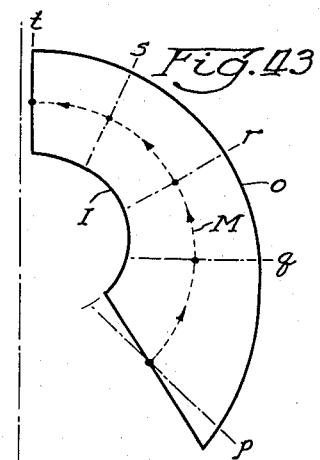
Fig. 43
Inventors:
Reinhold C. Zeidler and
William A. Barnes
By: Edward C. Gritzbaugh
Atty.

Dec. 22, 1953   R. C. ZEIDLER ET AL   2,663,149
ROTARY TURBINE-TYPE HYDRAULIC TORQUE CONVERTER
Filed Dec. 30, 1950   14 Sheets-Sheet 12
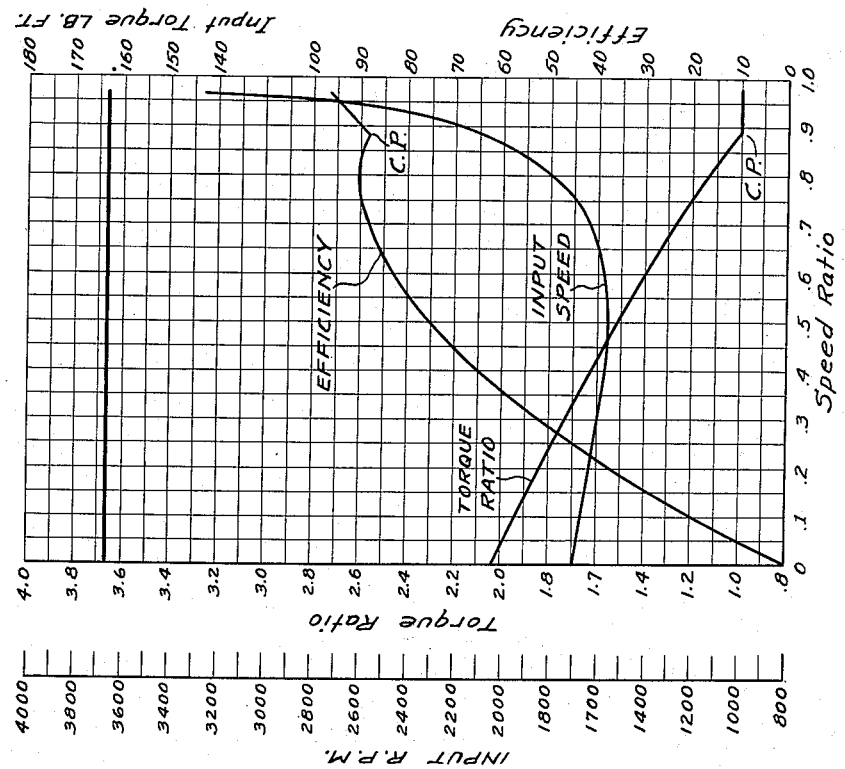
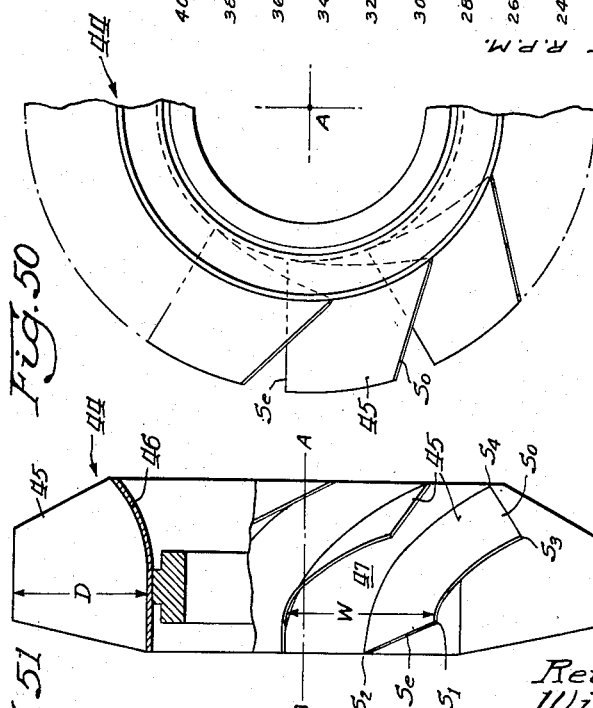
Inventors:
Reinhold C. Zeidler and
William A. Barnes
By: Edward C. Fitzbaugh
Atty.

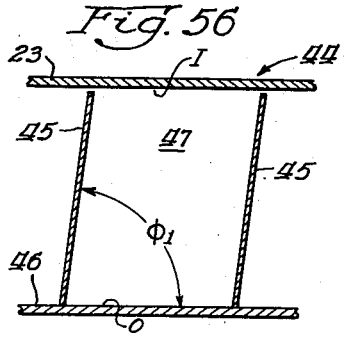
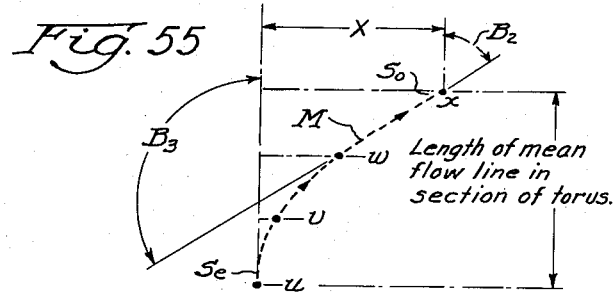
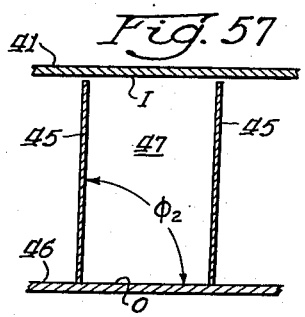
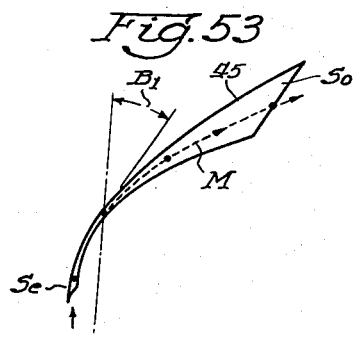
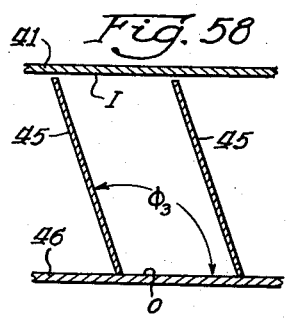
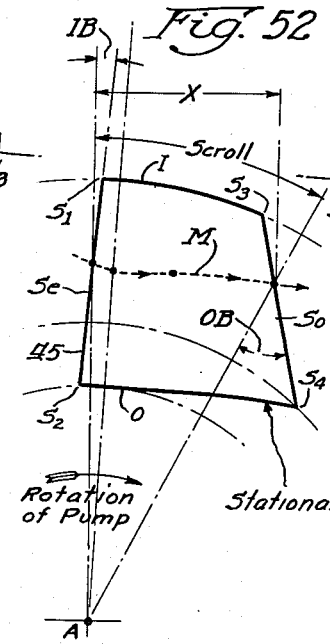
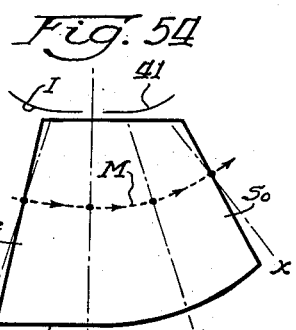
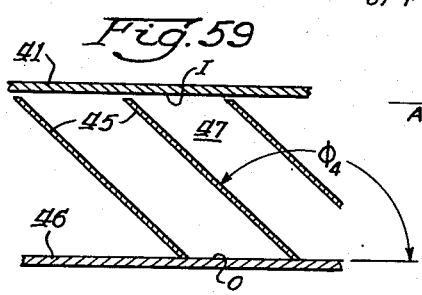

Patented Dec. 22, 1953

2,663,149

UNITED STATES PATENT OFFICE 2,663,149

ROTARY TURBINE-TYPE HYDRAULIC TORQUE CONVERTER

Reinhold C. Zeidler and William A. Barnes, Detroit, Mich., assignors to Borg-Warner Corporation, Chicago, Ill., a corporation of Illinois Application December 30, 1950, Serial No. 203,698

22 Claims. (Cl. 60—54)

This invention relates to hydrodynamic coupling devices and, more particularly, to hydraulic torque converters embodying pump, turbine and reaction members defining a closed toroidal fluid path and including vanes curved to circulate the fluid in a manner to multiply torque received from an engine.

It is a primary object of the invention to provide improved hydraulic torque converters having the vane curvatures of the pump, turbine and reaction members thereof designed to effect the transmission of power at varying speeds by the kinetic energy of a fluid, and wherein any applied driving speed and torque will be translated into a driven speed and torque, of which the torque varies automatically in accordance with the load and the speed varies inversely with the torque.

Another object of the invention is to provide improved hydraulic torque converters of the single stage two-phase type, particularly adapted for automotive transmissions, but capable of being used in other installations.

Another object of the invention is to provide hydraulic torque converters adaptable for automotive transmission use and having the vanes of the pump, turbine and reaction members designed, for this purpose, to provide converters having axial and diametrical compactness while having a generally acceptable stall torque ratio obtainable at low input speeds of the automotive engine.

It is contemplated that improved hydraulic torque converters, embodying our invention, have vane curvatures providing inlet and outlet angles designed and so related to each other as to control the flow of fluid in the converters in a manner to provide adequate torque multiplication ratios at stall, high torque-transmitting capacity, and affording high efficiency in the torque conversion range and the coupling range favoring adaptability to automotive engines, while being of the simple single stage two phase type and having minimum axial and diametrical dimensions particularly desirable in their use in automobiles having limited transmission space accommodations for hydraulic torque converters. While torque converters of the multiple stage and/or polyphase type, including two or more pumps and turbines, may be of the same, or smaller size than our improved torque converter design, torque converters embodying the present invention have considerable advantage over such converters in manufacturing economy due to the increased cost of making the various pumps and/or turbines of the multiple stage and/or polyphase converters over the cost of the single pump and turbine of our torque converters. While torque converters of the multiple stage and/or polyphase type now used in automobiles have slightly larger torque multiplication ratios at stall than our converters, such advantage is only realized by accepting accompanying undesirable factors including considerable converter and engine noises, and also high engine input speeds, requiring auto engines of larger horsepower than those previously found satisfactory for use with the conventional mechanical automotive transmissions; in many cases, the engines being designed for use with the torque converters. The torque converters, embodying the present invention, have been particularly designed to obtain satisfactory torque multiplication ratios at stall with acceptable small converter noise at comparatively low engine input speeds.

These and other objects and advantages of the invention will appear more clearly from the following specification in connection with the accompanying drawings, in which:

In the drawings:

Fig. 1 is a diagrammatic illustration of a hydraulic torque converter in which the novel vane curvature designs of the present invention may be embodied;

Fig. 2 is a diagrammatic illustration of pump, turbine and reaction member vanes showing the curvatures thereof along the middle streamline or mean flow line;

Fig. 3 is a longitudinal section through a hydraulic torque converter having the torus circuit of Fig. 1 defined by the pump, turbine and reaction members, the members being provided with vanes curved in accordance with one embodiment of the invention;

Fig. 4 is a side elevation of a portion of the pump of the torque converter shown in Fig. 3, said view being taken on line 4—4 of Fig. 3;

Fig. 5 is a sectional view of the pump shown in Fig. 4;

Fig. 6 is a greatly enlarged edge view of one of the similar vanes of the pump shown in Fig. 5;

Fig. 7 is an end view of the pump vane shown in Fig. 6, said view being taken on the line 7—7 of Fig. 6;

Fig. 8 is a view illustrating the portion of the torus or fluid circuit through which the pump vane of Figs. 6 and 7 rotates;

Fig. 9 is a diagrammatic illustration of the mean flow line of the pump vane shown in Figs.

Figure 38:
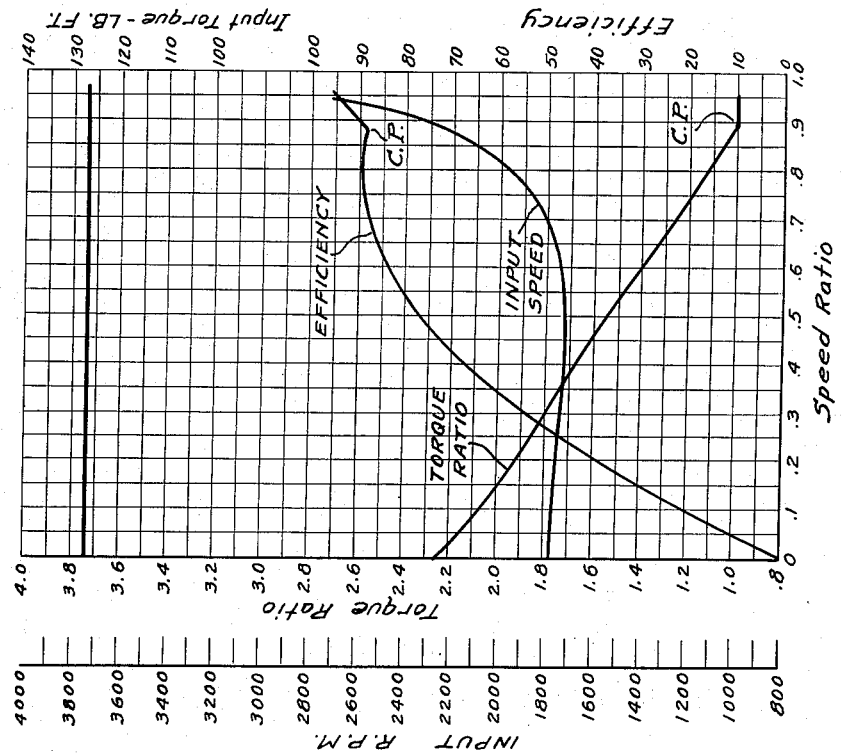
Figure 27:
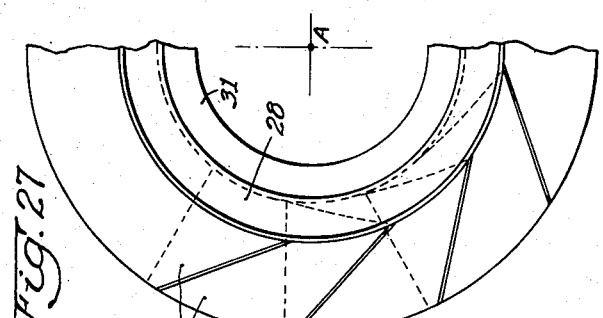
Figure 28:
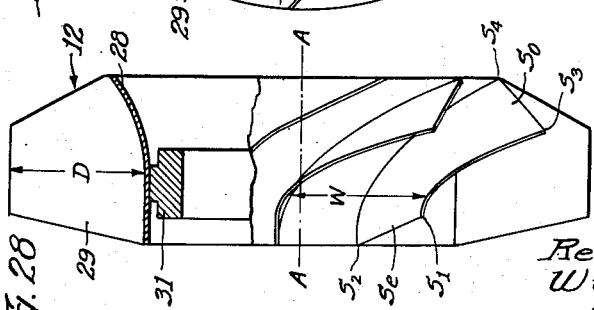
Figure 60:
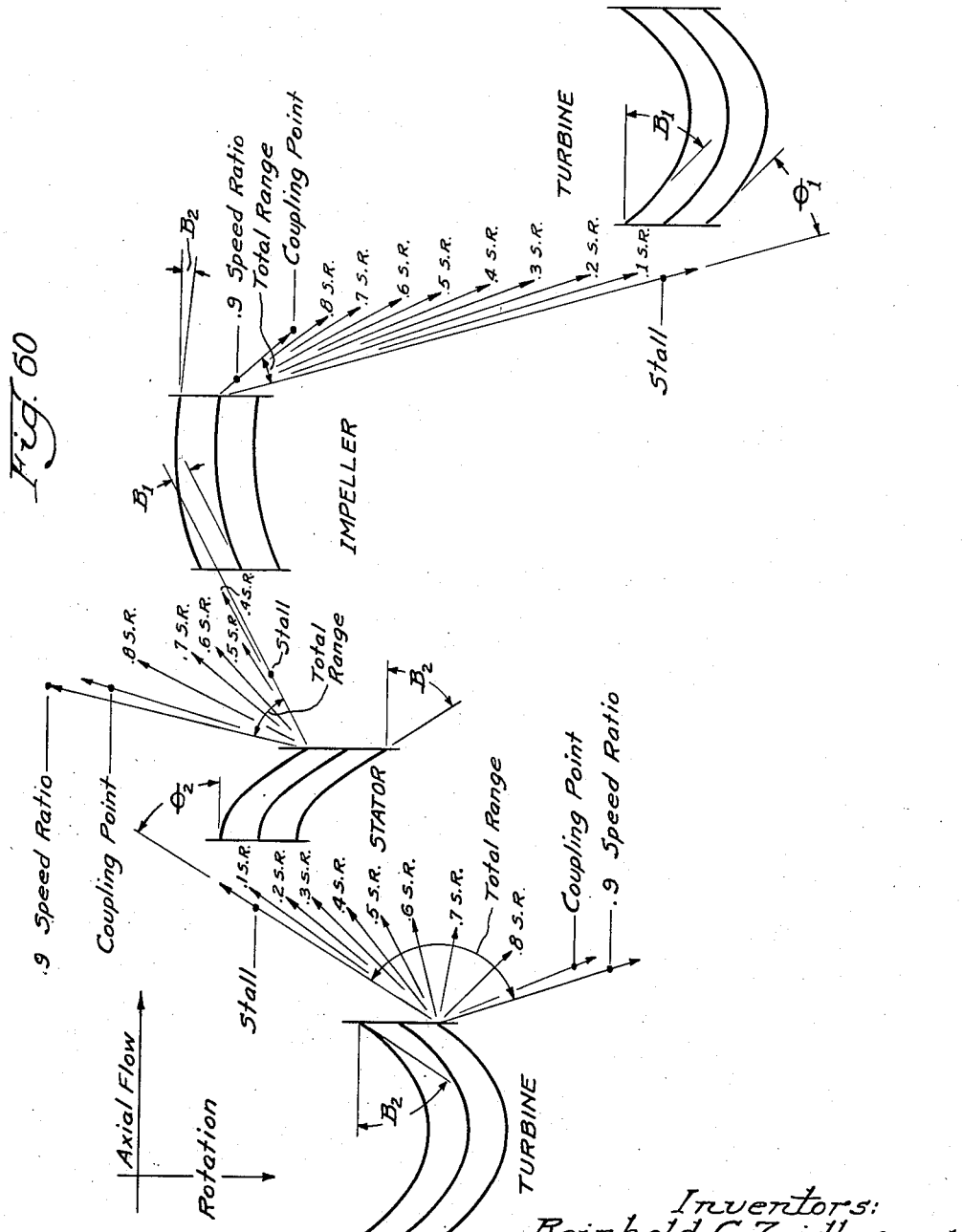

6 and 7, the pump vane being rolled out to more clearly illustrate the mean flow line thereof;

Figs. 10, 11, 12, 13, and 14 are diagrammatic views, based on Fig. 8, showing duct cross-sections defined in the pump between the vanes and the inner and outer borders of the converter fluid circuit, and particularly the angular inclinations of the vanes with respect to the inner and outer borders;

Fig. 15 is a side elevation of a portion of the turbine shown in Fig. 3, said view being taken on line 15—15 of Fig. 3;

Fig. 16 is a sectional view of the turbine shown in Fig. 15;

Fig. 17 is an edge view of one of the similar turbine vanes shown in Fig. 15 and as illustrated in Fig. 15;

Fig. 18 is an end view of the vane shown in Fig. 17, said view being taken in the direction indicated by the arrows 18—18 in Fig. 17;

Fig. 19 is a view illustrating the space in the turbine portion of the fluid circuit through which the turbine vane shown in Figs. 17 and 18 rotates;

Fig. 20 is a diagrammatic representation of the mean flow line of the turbine vane shown in Figs. 17 and 18, the vane being rolled out to more clearly illustrate the mean flow line;

Figs. 21 to 26, inclusive, are diagrammatic views, based on Fig. 19, showing duct cross-sections, defined in the turbine, by the vanes and the inner and outer borders of the converter fluid circuit, and particularly the angular inclinations of the vanes with respect to the inner and outer borders;

Fig. 27 is a side elevation of a portion of the reaction member shown in Fig. 3 looking toward the stator or reaction member from the right side of the reaction member as seen in Fig. 3;

Fig. 28 is an edge view of the reaction member shown in Fig. 27, certain portions of the reaction member being broken away to more clearly illustrate the structure thereof;

Fig. 29 is a side elevation of one of the similar stator vanes shown in Figs. 27 and 28;

Fig. 30 is an edge view of the reaction member vane shown in Fig. 29, said view being taken along the line and in the direction indicated by the arrows 30—30 of Fig. 29;

Fig. 31 is an illustration of a portion of the torus or fluid circuit of the converter illustrating the space through which the reaction member vane rotates;

Fig. 32 is a diagrammatic representation of the mean flow line of the stator vane shown in Figs. 29 and 30, the vane being rolled out to more clearly illustrate the mean flow line thereof;

Figs. 33 to 36, inclusive, are diagrammatic views showing cross-sections of the duct in the reaction member, related to Fig. 31 and illustrating the angular inclinations of the vane relative to the inner and outer borders of the converter fluid circuit;

Fig. 37 is a diagrammatic vectorial representation showing the relative fluid flow angles at stall and during different portions of the torque-converting range and the coupling range of the pump, turbine and reaction member vanes shown in Figs. 3 to 36, inclusive;

Fig. 38 is a graph illustrating the efficiency and torque characteristics of the torque converter;

Figs. 39 to 61, inclusive, are views illustrating a torque converter forming another embodiment of our invention and, more particularly;

Figs. 39 and 40 are views illustrating the pump thereof, Fig. 39 being a side elevation and Fig. 40 being a sectional view thereof;

Fig. 41 is an edge view of one of the vanes shown in Figs. 39 and 40;

Fig. 42 is an end view of the vane shown in Fig. 41, said view being taken on line 42—42 of Fig. 41;

Fig. 43 is a view illustrating the portion of the torus or fluid circuit through which the pump vanes, shown in Figs. 41 and 42, rotate;

Fig. 44 is a view illustrating diagrammatically the mean flow line of the pump vane shown in Figs. 41 and 42, the vane being rolled out to more clearly illustrate the mean flow line;

Figs. 45 to 49, inclusive, are diagrammatic views showing different cross-sections of one of the pump ducts related to Fig. 43 and illustrating the angular inclinations of the vanes relative to the inner and outer borders of the converter fluid circuit;

Fig. 50 is a side elevation of the reaction member as seen from the right in Fig. 51;

Fig. 51 is an edge view of the reaction member shown in Fig. 50, certain portions of the reaction member being broken away to more clearly illustrate the structure thereof;

Fig. 52 is a side elevation of one of the stator vanes shown in Figs. 50 and 51;

Fig. 53 is an edge view of the stator vane shown in Fig. 52, said view being taken on line 53—53 of Fig. 52 and looking in the direction of the arrows;

Fig. 54 is a portion of the torus or fluid circuit of the torque converter indicating the space through which the stator vanes pass;

Fig. 55 is a diagrammatic representation of the mean flow line of the stator vane shown in Figs. 52 and 53, the vane being rolled out to more clearly illustrate the mean flow line;

Figs. 56, 57, 58, and 59 are diagrammatic views showing different cross-sections of a stator duct, related to Fig. 54, and illustrating the angular inclinations of the vanes relative to the inner and outer borders of the converter fluid circuit;

Fig. 60 is a diagrammatic vectorial presentation showing the relative fluid flow angles at stall and during different portions of the torque-converting range and at the coupling point; and Fig. 61 is a graph illustrating the efficiency and torque characteristics of the converter.

Similar reference numerals are applied to corresponding parts throughout the views.

It is well known in the hydraulic torque converter art that the vane curvature design of the pump, turbine and stator elements influence and directly affect the torque multiplication, performance and efficiency characteristics of torque converters. Among the factors of vane curvature design affecting the torque multiplication characteristics at stall, when the highest torque multiplication occurs, and throughout the subsequent torque multiplication range, are the shock losses occurring at the entrance to the vaned member, due to the fluid discharge from one vaned member encountering the vanes of the next vaned member at an awkward angle, producing a churning action with consequent loss of power due to the decrease in fluid velocity at the juncture of vaned channels of two adjacent vaned members. In an endeavor to provide a solution to this shock loss problem, certain torque converters of the single stage, two phase type have been designed with vane curvatures believed to provide high efficiency and high torque multiplication on the theory that the entrance and discharge angles of the vanes of the pump, turbine and stator should be related so as to obtain a smooth and substantially shockless flow of the fluid from one vaned element to the next vaned element at the stall speed of the pump, that is, when the turbine is standing still or rotating at low speed. While such torque converters have minimum shock losses at stall and in the initial torque multiplication range of the torque converters, it has been found that such torque converters are only generally satisfactory for power units, such as steam engines, electric motors, etc., capable of providing continually high input speeds at stall and throughout a substantial portion of the torque-converting range of the torque converter, and in installations where size of the torque converter is not a critical factor. These torque converters are unsatisfactory for use in automobiles having internal combustion engines as their source of motive power, due to the harmful effects on the mechanical structure of the engine produced by sustained high speeds of the engine, and where the size of torque converters in the limited space allotted in automobiles for transmission installations require as small diametrical and axial dimensions of the torque converters as possible. In this respect, it is desirable that torque converters be of the smallest possible size for accommodation in automotive installations, but also to provide savings in weight which allows internal combustion engines to accelerate much faster from an idling position, with the torque converter having the least flywheel effect. To permit such acceleration, requirements of torque converters generally acceptable to automobile manufacturers at the present time are that torque converters have a torque multiplication range of 2.0 to 2.5 torque ratio at stall speeds between 1500 to 1800 R. P. M. (input engine speeds).

The invention is primarily concerned with the provision of torque converters, particularly adapted but not necessarily for automobile internal combustion engines, falling within the above-defined torque ratios and input speeds, and being particularly characterized by being of minimum size with respect to axial and diametrical dimensions while providing satisfactory stall torque ratios at low engine input speeds, and having high efficiency and performance throughout the torque conversion range and in the coupling range. It has been found in designing the blade curvatures of our torque converters to obtain these desirable advantages that it is possible to accept shock losses at stall and in the initial torque multiplication stages of the torque converters while still realizing satisfactory stall torque ratios generally acceptable for torque converters of the single stage, two-phase type, the shock losses reaching their minimum value at later stages of the torque conversion range. It will be apparent that such torque converters are capable of meeting the demands of automobile manufacturers on the basis of economy of operation of the engine, engine input speeds, and noise level of the engine.

Referring to Fig. 1, illustrating a diagrammatic representation of a torque converter of the single stage two-phase type including a pump P, a turbine T, and a reaction member or stator S, each of these torque converter elements having an axis of rotation indicated at A—A and defines a fluid circuit in which fluid circulates in the direction of the arrows in a substantially closed toroidal path. The fluid circuit has its inner contour or streamline identified at I, the outer contour or streamline designated at O, and the middle or mean streamline indicated at M. It is well known that the output torque in a hydraulic torque converter is determined by the shape of the blades, the mass or quantity of the circulating liquid, and the input speeds of the engine. Accordingly, in the design of torque converters of practicably small axial and diametrical dimensions, it is desirable that the volume of fluid be as large as possible within the fluid working circuit of the torque converter and in the area defined between the outer contour or streamline O and the inner contour or streamline I. For this purpose, the outer contour O is designed substantially circular, while the inner contour I is formed ovate in shape, as shown in Fig. 1. It will be apparent that the inner contour I retains a rounded form without sharp corners, thus avoiding an abrupt change of the flow of the fluid from a generally radial direction to a generally axial direction with its attendant disturbing turbulence decreasing the desired velocity of the fluid and consequent loss of efficiency of the torque converter. Located within the fluid circuit are the vanes $Pv$ of the pump, the vanes $Tv$ of the turbine, and the vanes $Sv$ of the stator S.

The pump, turbine and stator vanes are related to control the vortex flow of fluid through the working fluid circuit in a manner shown in Fig. 2, which illustrates the flat pattern development of the blade contours at the mean flow line or path (M in Fig. 1) through the fluid passages or ducts formed between adjacent blades of each of the particular vaned converter elements. We have found that vanes of the different converter elements having blade contours along the mean flow line or streamline of the general character shown in Fig. 2 and assuming variations in entrance and exit angles, within the range as hereinafter described, provide torque converters of minimum size, having satisfactory torque ratios at stall and throughout the torque conversion range within the lower limit of available speeds of passenger and truck automobile internal combustion engines.

A relationship and range of the entrance and exit angles of pump, turbine and stator vanes at the mean flow line, which satisfactorily provide torque converters having the above-described characteristics, can be generally designated, for the purpose of illustration as to location by reference to Fig. 2, wherein the entrance angles are designated $B_1$; the discharge or outlet angles, $B_2$; and the included angles $B_3$ formed by tangents to the entrance and discharge edges of the vanes along the middle streamline. The included angles $B_3$ are, according to our invention, in the range of from 60° to 105° for the turbine vanes and 90° to 140° for the reaction member or stator vanes, and from 115° to 195° for the pump vanes. The best general performance characteristics have been obtained by relating the entrance and outlet angles of the vanes with respect to the mean flow line M in Fig. 1 as follows:

|  | Entrance Angles $B_1$ | Discharge Angles $B_2$ |
|---|---|---|
| Pump Vanes | Between −5° to −35°. | Between −20° to +30°. |
| Turbine Vanes | Between +25° to +49°. | Between −50° to −70°. |
| Reaction Member Vanes | Between −15° to +5°. | Between +45° to +75°. |

The system of measuring vane entrance and exit angles given above and when hereinafter referred to in the specification and claims contemplates zero vane angles to have no backward or forward bend: i. e. all angles are measured from a plane of reference which passes through and is perpendicular to the axis A—A of rotation of the converter. In the system, vane angles which have a component in the direction of rotation are taken as positive, and vane angles which have a component opposite to the direction of rotation are taken as negative. Trigonometric functions of their angles, as used in torque converter design, derive their plus or minus sign from the above rules. Accordingly, the angle $B_1$ or $B_2$ is the angle measured between an axial plane extending through the intersection of the entrance or exit edge of the particular vane and the mean flow line on the pressure face of the vane and passing through a line tangent to the true mean flow line. At any other point on the mean flow line between the entrance and exit edges of the particular vane, the axial plane would pass through the point and the angle would be measured between this axial plane and a line tangent to the true mean flow line on the pressure face of the vane.

As previously mentioned, it is a requirement of automobile manufacturers in any contemplated use of hydraulic torque converters that the torque converters be designed to be of small diametrical dimensions so as to be compatible with the limited space accommodations for transmissions in passenger and truck automobiles. A generally satisfactory and acceptable torque converter size is eleven inches (11"), and torque converters of this size, having vane curvatures defining entrance and exit angles, as well as included angles, within the above-designated range of angles, have been designed by us and are now being manufactured in production quantities for use in automobiles.

Figs. 3 to 38, inclusive, illustrate an example of a production torque converter of the single stage two-phase type and embodying the invention, the vane curvatures of the pump, turbine and stator coming within the range of vane entrance and exit angles, as well as the included angles, given in the above range of angles. Figs. 39 to 61, inclusive, illustrate an example of another production torque converter having different vane curvatures of the pump and stator than those in the first-mentioned example, the vane curvatures falling within the range of exit, entrance and included angles of the identified range of vane angles given above, the turbine entrance, exit and included angles being identical with those of the hydraulic torque converter illustrated in Figs. 3 to 38, inclusive. It will be apparent from the hereinafter detailed description of these two examples of production torque converters that these torque converters have the above generally identified and described characteristics of hydraulic torque converters embodying the invention.

We have discovered, through extensive experiments, that the two examples of hydraulic torque converters referred to above are satisfactory for association with automotive internal combustion engines and ranging from 100 foot pounds torque and an input speed of 1500 revolutions per minute at stall to 170 foot pounds torque and an input speed of substantially 1700 revolutions per minute at stall, with the torque ratio at stall ranging between 2.0:1 to 2.5:1. The torque converters are particularly designed to be of the smallest practicable diametrical dimensions for general acceptance by automobile manufacturers, the present torque converters being designed to be 11" in the outside diameter of the fluid circuit.

The torque converter illustrated in Figs. 3 to 38 is designed for use with internal combustion engines having a range from 100 foot pounds torque and an input speed of 1500 R. P. M. at stall, to 130 foot pounds torque and an input speed of 1768 R. P. M. at stall, with the torque converter providing a torque ratio of 2.2:1–2.5:1 at stall. The torque converter illustrated in Figs. 39 to 61, inclusive, is designed for use with internal combustion engines having a range from 140 foot pounds torque and an input speed of 1515 R. P. M. at stall to 170 foot pounds torque and an input speed of about 1700 R. P. M. at stall, with the torque converter providing a torque ratio of 2.00:1 to 2.15:1 at stall.

More particularly and referring to the hydraulic torque converter in Figs. 3 to 38, inclusive, and referring first to Fig. 3, the hydraulic torque converter there shown has the identical torus-shaped fluid circuit, as shown in Fig. 1, and is formed by a pump or impeller 10, a turbine or runner 11, and a stator or reaction member 12. Figs. 3, 4 and 5 illustrate the pump 10 as comprising an outer shell or shroud 13 and an inner core shell or shroud 14. The shells 13 and 14 are spaced substantially semi-toroidal annular members of different diameters connected by a plurality of vanes 15 extending therebetween to provide a number of passages or ducts 16 in the pump. The vanes may be secured to the casing or shroud by any suitable means, as by welding. The outer shell 13 is provided with a hub 17 rotatably mounting the pump upon a stationary sleeve 18 of a casing (not shown) housing the converter. The outer shell 13 of the pump is connected at its outer periphery to a flywheel driving member 19 having an axially extending flange 20 secured to the shell 13 of the pump, the driving member 19 being secured to an engine input shaft 21. It will be apparent that the shell 13 of the pump, the driving member 19 and the engine input shaft 21 define a closed fluid chamber.

The turbine 11 shown in Fig. 3 and Figs. 15 and 16 also comprises two substantially semi-toroidal annular members of different diameters, one providing an outer shell or shroud 22 and the other an inner shell or core ring 23, the shell 23 being positioned within the shell 22 and held in spaced relation thereto by a plurality of intervening vanes 24, defining therewith passages or ducts 25 in the turbine. The vanes are secured to the outer shell and core ring in any suitable manner, for example, by welding. The outer shell 22 is secured to a hub 26 having a splined connection to a driven shaft 27.

Referring to Figs. 3, 27, and 28, the stator 12 is composed of an outer annular member or shroud 28 having a somewhat concavo-convex cross-section, to which is secured a plurality of circumferentially spaced vanes 29 defining fluid passages or ducts 30. A one-way brake device, identified generally at Q and which is of the sprag type, is disposed between the hub 31 of the stator 12 and a collar 32 splined to the stationary part 18 of the converter casing. The one-way brake Q is operative to prevent rotation of the stator in one direction during the torque multiplication stages of the converter, while permitting rotation of the stator in the opposite direction at what is commonly termed the coupling point of the torque converter.

It will be apparent from an inspection of Figs.

1 and 3 that the outer shells 13 and 22 of the pump and turbine, respectively, and the annular member 28 of the stator provide the outer border O and define, with the core rings 14 and 23 of the pump and turbine, respectively, (providing the inner border I) a torus chamber for the fluid vortex circuit of substantially the same configuration in Fig. 3 as that shown in Fig. 1. It may be noted from an inspection of these figures that the core rings 14 and 23 have their adjacent edges in close proximity and overlying the adjacent ends of the stator vanes 29 for the purpose of minimizing the escape of fluid from the fluid vortex circuit into the annular chamber defined by the core rings, this advantageous feature being of considerable value in maintaining the fluid circulating in the circuit at a high velocity. This particular arrangement is described and shown in patent application Serial No. 182,302, filed August 30, 1950, in the name of R. C. Zeidler, now abandoned.

Referring now to the drawings, Figs. 4 to 14 illustrate the vane curvatures of the pump; Figs. 15 to 26 the vane curvatures for the turbine, and Figs. 27 to 36 the vane curvatures of the stator. Considering the pump vanes 15 in Figs. 4, 6 and 7, these vanes are disposed in equal circumferentially spaced relation in the outer shell 13 of the pump and are similarly curved or shaped to provide entrance portions $Pe$ for the fluid flowing into the ducts 16, formed by the vanes, from the reaction member. The entrance portions $Pe$ of the vanes are bent forwardly with respect to the direction of rotation of the pump, the central portion of the vanes indicated at $Pi$, between the inlet portion $Pe$ and the outlet portion $Po$, being twisted helix-wise; and the outlet portion $Po$ being rearwardly bent with respect to the rotation of the pump and so that the fluid flowing through the ducts 16 will flow in a direction rearwardly of the direction of rotation of the pump and be discharged in the same direction by the pump outlet portions $Po$. Figs. 6, 7, 8, and 9 illustrate the entrance angle $B_1$, the outlet angle $B_2$ and the included angle $B_3$, as well as various angles taken at different sections of the vane, each angle being measured between an axial plane through the particular point on the mean flow line indicated by M and a line tangent to the mean flow at that point, in accordance with the vane angle system previously described for defining the general range of vane angles. It may be noted that such vane angle system contemplates the angle is positive, when the angle is such that the vane tends to direct the flow toward the direction of rotation relative to the axial plane; and that the angle is negative when the angle is such that the vane tends to direct the flow away from the direction of rotation relative to the axial plane. In accordance with this vane angle system, entrance angle $B_1$ at section $a$ of Figs. 8 and 9 is $-27°$; the angle at section $b$ is $-15°$; at section $c$, the angle is $-10°15'$; at section $d$, the angle is $-9°45'$; the outlet angle $B_2$ at section $e$ is $-9°30'$, the sections $a$ and $e$ being shown at the inlet $Pe$ and the outlet $Po$, respectively, of the vane. The included angle $B_3$ (Fig. 9) is $162°30'$. The path of the assumed mean effective flow is indicated at M and is commonly referred to as the design path and is used for definition of vane angles, entrance and exit radii, etc. It will be noted from an inspection of Figs. 8 and 9 that the angle of the inlet bias (IB) is $11°$ and that the angle of the outlet bias is $16°15'$. The inlet and outlet biases designate the angular discrepancy at the inlet and outlet edges of the vane where the full length of the inlet and outlet edges of the vanes are not in an axial plane, that is, the plane containing the axis of rotation. The term "Scroll" indicates the angle between the two planes containing the intersection of the design path and the inlet and outlet edges of the vanes when the vanes do not lie in one axial plane and is an angle of $9°15'$. These definitions of the terms "bias," "scroll," and "design path" will be utilized throughout the description.

Fig. 9 illustrates the true length of the mean flow line of the pump vane shown in Figs. 6 and 7 and used for identifying the foregoing angles, the vane being shown in its rolled out form to more clearly illustrate the mean flow line and the angles with respect to the mean flow line. It will be noted that, when the curve identified as the mean flow line is plotted from the reference line, the distances between the sections $a$ and $b$, $b$ and $c$, etc. are measured between the mean flow line projection as rotated into the cross-section of the torus. The dimension "X" identifies an area bounded by parallel planes respectively passing through the inlet and outlet edges of the vanes along the mean flow line M. It may be noted that this "X" dimension is somewhat relative and only shows the general shape of the curve. The angle through which the fluid is turned is the supplementary angle to the included angle $B_3$.

Referring to Figs. 15, 16, 17, 18, 19, and 20, illustrating the similar turbine vanes 24, each vane is characterized by its exaggerated curvature substantially in the form of a parabola or hyperparabola to provide entrance portions $Te$ receiving fluid flowing into the ducts 25, formed by the vanes 24, from the pump. It will be seen from an inspection of Figs. 19 and 20 that, when the vane angle system previously described is used and which contemplates the angles formed by the geometry of a vane at its entrance and exit edges, the entrance angle $B_1$ at the entrance portion of the vane (section $f$) is $+45°$; at the section $g$, $+42°15'$; at the section $h$, $+26°15'$; at section $i$, $0°$; at section $j$, $-36°15'$; and at the outlet portion of the turbine vane (section $k$), the outlet angle is $-58°$. As seen in Fig. 17, the outlet bias OB is $26°30'$, and the inlet bias IB is $18°45'$. In the present case, the Scroll is $0°$ inasmuch as an axial plane passes through a radial plane intersecting the axis of the turbine and points on the mean streamline M at the inlet and outlet edges of the vane. Fig. 20 illustrates the mean flow line when the vane has been rolled out showing the true shape of the mean flow line with reference to an axial plane or reference line. It will be noted that, when the curve illustrating the mean flow line is plotted from the reference line, the distances between the sections $f$ and $g$, $g$ and $h$, etc. are measured along the mean flow line projection as rotated into the cross section of the torus. The angle through which the fluid is turned is the supplementary angle to the included angle $B_3$ of $77°$.

Figs. 27 to 32 illustrate the stator vanes, each vane being warped helix-wise, the fluid entrance portions being designated $Se$ and the fluid outlet portions being designated $So$, the mean flow line being indicated at M. The various entrance, exit and other angles are calculated according to the vane angle system previously described. At the entrance portion $Se$ (section $l$) of the stator vane, the angle $B_1$ is $0°$; at section $m$, the angle is $+39°$; at section $n$, the angle is $+58°30'$; and at section $o$ at the exit edge $So$ of the stator vane, the angle $B_2$ is +65°. The Scroll angle is 34°15', the outlet bias (OB) angle is 47°30', and the inlet bias (IB) angle is 5°.

Referring to Fig. 32, illustrating the mean flow line on the stator vane in its rolled out position and from which the just described vane angles were obtained, it will be noted that the included angle $B_3$, defined by the inlet and outlet angles $B_1$ and $B_2$, is 115°, the angle through which the fluid is turned being the supplementary angle to the included angle.

It will be noted from an inspection of Figs. 4 and 5, that each of the pump channels 25 generally increases in width W and decreases in depth D from its entrance to its exit. As the pump vanes are identical and equally spaced, it will be apparent that cross-sectional areas of the pump channels, while varying in width and depth, are substantially equal and thereby are effective to allow substantially the same volume of fluid to flow through each channel at its entrance and exit or at any point between the entrance and exit of the channel. It will also be seen from Figs. 15 and 16 that each of the turbine channels 25 also generally increases in width W and decreases in depth D from its entrance to its exit, whereby the cross-sectional areas of the turbine channels, while varying in width and depth, are substantially equal and are effective to allow substantially the same volume of fluid to flow through each channel at its entrance and exit or at any point between the entrance and exit of the channel. As illustrated in Figs. 27 and 28, the channels 30, defined by the stator blades 29, the annular ring 28 and the portions of the core rings 14 and 23 overlying the radially outer edges of the stator vanes, each have a width W and depth D which may vary slightly with respect to each other at different portions of the channel but are related in such manner as to allow substantially the same volume of liquid to flow through each stator channel at its entrance and exit or at any point between the entrance and exit.

The shapes of the converter profile defined by the previously described inner and outer borders I and O of the converter vaned elements are important in designing the vane curvatures to equalize the velocity distribution between the outer and inner borders as much as possible, as, should the circulation at the inner border I be higher than at the outer border O, it will be detrimental to the behavior of the individual portions of the total flow. While the mean flow of fluid by the vanes determines the kinetic energy transfer, the relationship of the inner and outer borders I and O introduces deviations below and above the average or mean flow properties of each vaned element, due to the velocity difference at the inner and outer borders.

In the present torque converter, the vanes of the pump, turbine and stator have been designed so that the fluid velocities within each of these vaned elements are substantially even, with consequent smooth and efficient flow of the fluid through the channels of the individual vaned elements.

To this end and referring to Figs. 4 and 6, the pump vanes are bounded by the points P1, P2, P3, and P4; P3 and P4 define the entrance edge, and P1 and P2 define the exit edge. The entrance edge has its inner tip P3 on the inner border I and its outer tip P4 on the outer border O, the outer tip P4 lying in front of the inner tip P3 in relation to the direction of rotation of the pump. The exit edge has its inner tip P2 on the inner border I and its outer tip P1 on the outer border O, with the inner tip P2 lying in front of the outer tip P1 in relation to the direction of rotation of the pump.

Referring to Figs. 15 and 18, the entrance and exit edges of each turbine vane is bounded by the points T1, T2, T3, and T4. The entrance edge has its outer tip T1 on the outer border O lying behind the inner tip T2 on the inner border I in relation to the direction of rotation of the turbine, and the exit edge has its inner tip T3 lying ahead of its outer tip T4 in relation to the direction of rotation of the turbine.

Referring to Figs. 28 and 29, the entrance and exit edges of each stator vane are bounded by the four points S1, S2, S3, and S4. S1 and S2 defining the entrance edge and S3 and S4 defining the exit edge. The entrance edge has its outer tip S1 lying behind its inner tip S2 in relation to the direction of rotation of the pump, and the exit edge has its outer tip S3 lying ahead of the inner tip S4 in relation to the direction of rotation of the pump. The curvatures of the vanes provide the relationship of the aforesaid outer and inner tips of each of the pump, turbine and stator vane exit and entrance edges to effectively equalize the velocity distribution between the inner and outer borders in each of the vaned elements; and also to obtain substantially the same energy conversion along each path of fluid stream in the converter profile fluid circuit, the curvatures of the vanes have been changed gradually from the streamline at the inner border I to the streamline at the outer border O, and particularly, to provide an entrance angle of —29 degrees at the inner streamline of the pump vane which is 4 degrees larger than the angle of —25 degrees at the outer streamline; to provide an entrance angle of +47 degrees at the inner streamline of the turbine vane which is 3½ degrees more than the angle of +43½ degrees at the outer streamline; the inner and outer streamline at the entrance portion of the stator vane being in the same plane and, accordingly, these streamlines have no angular inclination. The exit angle of —9½ degrees at the inner streamline of the pump vane is the same as the exit angle of —9½ degrees at the outer streamline of the pump vane, while the exit angle of —70 degrees at the inner streamline of the turbine is 12½ degrees larger than the angle of —57½ degrees at the outer streamline, and the exit angle of +73½ degrees at the inner streamline of the stator vane is 9½ degrees larger than the angle of +64 degrees at the outer streamline. The change in the included angles from the inner streamline to the outer streamline is 4 degrees for the pump vanes, as the included angle of the inner streamline is 160½ degrees and the included angle of the outer streamline is 164½ degrees. The change in the included angle from the inner streamline to the outer streamline is 16 degrees for the turbine vanes, as the included angle of the inner streamline is 63 degrees and the included angle of the outer streamline is 79 degrees. The change in the included angle from the inner streamline to the outer streamline is 9½ degrees for the stator vanes, as the included angle of the inner streamline is 106½ degrees and the included angle of the outer streamline is 116 degrees. The included angles formed by tangents to the inner streamline at the entrance and exit being generally 160 degrees for the pump, 63 degrees for the turbine, and 106 degrees for the stator, and the included angles formed by tangents to the outer streamline at the entrance and exit being generally 164 degrees for the pump, 79 degrees for the turbine, and 116 degrees for the stator. It will be seen from an inspection of Figs. 4 and 6, 15 and 17, and 28 and 29, that these changes in the aforesaid angles, and the vane angles particularly described heretofore, will provide vanes having continuously and gradually changing portions conducive to providing smooth flow of the fluid at each streamline in the torus fluid circuit.

Another factor tending toward equalization of pressure and velocities over the channel cross-sections is the angular relationship between the pressure faces of the pump, turbine and stator vanes to the outer and inner borders O and I, defining the torus of the converter. For the purpose of equalizing the pressure and velocities, the particular vane curvatures have also been designed to be related to the outer and inner borders as will now be described. Referring to Figs. 10 to 14, inclusive, these views illustrate different cross sections of one of the channels of the pump, the cross sections of the pump being unwrapped to disclose the inner and outer borders in parallel planes with the vanes assuming resultant angular positions.

Figs. 10 to 14 illustrate generally the angular disposition of the pressure faces of the pump vanes with respect to the outer and inner borders O and I, and it will be seen from an inspection of these figures that the various cross-sections of the pump channel are of non-rectangular parallelogram form. The cross-section of the channel entrance portion in Fig. 14 and taken at section $a$ in Fig. 8 shows the pressure face of each vane forming an angle $A_1$ greater than 90° with the outer contour wall O, or, more particularly, an angle of about 95½°; the channel cross-section in Fig. 12 (section $b$ in Fig. 8) illustrates the pressure face of each vane forms an angle $A_2$ of less than 90° with the outer contour wall, or, more particularly, an angle of about 84°; Fig. 13 illustrates the channel cross-section taken on section $c$ of Fig. 8, the pressure face of the pump vane being similarly disposed at an angle $A_3$ of generally 84° to the outer contour wall; Fig. 14 illustrates the cross-section taken on section $d$ in Fig. 8, and it will be seen that the angle $A_4$ formed by the pressure face of each pump vane with the outer contour wall O is less than 90° and, more particularly, generally 76°45'; and the exit portion, indicated at section $e$ in Fig. 8, shows each pump vane forming an angle $A_5$ of less than 90° with the outer contour wall O and, more particularly, an angle of generally 75°.

Figs. 21 to 26, inclusive, illustrate different cross-sections of a turbine channel and respectively consecutively taken in sections of $f$ to $k$, inclusive, of Fig. 19 to show generally the angular relationship of the turbine vanes to the outer and inner borders O and I defining the turbine torus portion of the converter, the particularly designated cross-sections of the turbine being unwrapped to disclose the outer and inner borders in parallel planes with the vanes assuming angular positions parallel to each other in each view as a condition of the unwrapping action. It will be apparent from an inspection of Figs. 21–26 that the angular relationship of the vanes is such that all of the various channel cross-sectional areas are of non-rectangular parallelogram form. The pressure faces of the vanes at each duct entrance shown in Fig. 21 forms an angle $a_1$ greater than 90° with the outer contour wall O, or an angle of generally 108°; the pressure faces of vanes illustrated in Fig. 22 form an angle $a_2$ greater than 90° with the outer contour wall and, more particularly, approximately 92°30'; the pressure faces of the vanes in Fig. 23 are at an angle $a_3$ of less than 90° with the outer contour wall or, more particularly, about 84°; the pressure faces of the vanes of Figs. 24 and 25 form angles $a_4$ and $a_5$ less than 90° and, more particularly, about 71° (Fig. 24), 67° (Fig. 25), and the pressure faces of the vanes at the outlet portions Po of the vane forming an angle $a_6$ (Fig. 26) greater than 90° with the outer contour wall and, more particularly, about 105° at the outlet of the turbine channel.

Figs. 33, 34, 35, and 36 illustrate in the unwrapped form of the stator portion of the torus the angular relationship of the stator vanes with respect to the outer and inner borders O and I defining the stator torus portion of the converter, i. e. the particularly designated cross-sections $l$ to $o$ in Fig. 31 are unwrapped to disclose the inner and outer borders in parallel planes with the vanes assuming angular positions parallel to each other as a condition of the unwrapping action. Fig. 33 illustrates the substantially rectangular cross-section of a stator channel entrance and taken from section $l$ of Fig. 31, the pressure face of each stator vane making an angle $\phi_1$ of less than 90° with the outer contour wall or, more particularly an angle of generally 83°. Figs. 34, 35 and 36 are taken from sections $m$, $n$ and $o$ and illustrate these cross sections of the ducts, all of non-rectangular parallelogram form with the pressure faces of the vanes in Fig. 34 forming an angle $\phi_2$ of about 90° with the outer contour wall, the pressure faces of the vanes in Fig. 35 forming an angle $\phi_3$ greater than 90° with the outer contour wall or, more particularly, about 118°, and Fig. 36 illustrating the stator exit channel cross section and showing the pressure faces of the vanes at an angle $\phi_4$ greater than 90° or, more particularly, approximately 152° with respect to the outer border.

Fig. 37 is a vectorial study of the relative fluid flow angles at stall and during different portions of the torque-converting range and at the coupling point effected by the moving pump and turbine, and the stationary stator vanes, the various vanes having inlet and outlet angles, the included angles, and other features previously described. The various calculated angles of fluid flow at the junctions between two adjacent vaned wheels, and as measured with respect to an axial plane, are given below:

|  | Angle of Fluid from Exit of Stator Relative to Pump | Angle of Fluid from Exit of Pump Relative to Turbine | Angle of Fluid from Exit of Turbine Ducts Relative to Stator |
|---|---|---|---|
| Stall | +1° | +74°15' | −58° |
| .1 Speed Ratio (S. R.) | −3° | +73° | −55° |
| .2 Speed Ratio (S. R.) | −7° | +72° | −50° |
| .3 Speed Ratio (S. R.) | −10° | +70° | −43° |
| .4 Speed Ratio (S. R.) | −17° | +68° | −35° |
| .5 Speed Ratio (S. R.) | −23° | +65° | −22° |
| .6 Speed Ratio (S. R.) | −30° | +61° | −4° |
| .7 Speed Ratio (S. R.) | −44° | +57° | +23° |
| .8 Speed Ratio (S. R.) | −59° | +50° | +54° |
| Coupling Point | −71° | +42° | +68° |
| .9 Speed Ratio (S. R.) | −75°30' | +43°15' | +73°30' |

In explanation of the vector study shown in Fig. 37 and the foregoing table, the stall condition of the converter occurs when the pump is driven by the engine, and the load on the turbine prevents rotation of the turbine by the kinetic energy of the fluid circulating in the converter, at such time the various angles being identified by the designation "Stall." The term "Speed Ratio" or "S. R.," as designated in Fig. 37, is the speed relationship of the turbine and pump and is the turbine speed divided by the pump speed. The term "Coupling Point" is descriptive of the time and speed ratio when the stator freewheels by the change in the angular direction of the fluid flow from the turbine striking the vanes of the stator in a manner to effect rotation of the stator in the direction of rotation of the pump, the converter then acting as a fluid coupling transmitting, but not converting, torque from the engine to the load.

It may be noted that the total range of the angles of fluid flow from the turbine into the stator is 131°30′, from the stator into the pump is 76°30′, and from the pump into the turbine is 31°.

Fig. 37 illustrates that the angles of the entrance portions of the pump, turbine and stator vanes do not substantially correspond to the resultant discharge angles of the fluid flow from the neighboring vane exit portions at stall, so that shock losses are had between these adjacent vaned exit and entrance portions at stall, pronounced shock losses being had at the junction of the pump, exit and turbine entrance and also at the junction of the turbine exit and the stator entrance, due to the angular disposition of the absolute flow angle of the fluid from the exit of one vaned element with respect to the physical entrance portion of the vanes of the next adjacent vaned element. Calculated in this manner, the angular difference between the flow of fluid from the pump vane exit portion and the turbine vane entrance portion is indicated as the angle $\theta_1$, which is 29°15′, the angular difference between the flow of fluid from the turbine exit and the stator vane entrance portion is the angle $\theta_2$ of 58°, and the angular difference between the flow of fluid from the stator exit and pump vane entrance portion is the angle $\theta_3$ of 28° at the stall condition of the converter.

Referring more particularly to the junction of the exit portion of the impeller and the entrance portion of the turbine, it will be noted that the fluid flow at this junction does not change quickly with an increase of speed ratio, and it is not until between .8 and .9 speed ratio is obtained before the angle of the fluid flowing outwardly of the pump is equal to the angle of the entrance portions of the turbine vanes. Referring to the angle of fluid flow from the turbine exit into the entrance portions of the stator, it will be noted that the angle of fluid flow from the turbine equals the angle of the physical entrance portions of the stator vanes at between .6 and .7 speed ratio. Referring now to the angle of fluid flow from the exit of the stator into the pump, the angle of the fluid flow equals the angle of the physical entrance portions of the stator vanes between .5 and .6 speed ratio.

Summarizing the described angular relationships of the fluid flow from one vaned element to the entrance portions of the vanes of the adjacent vaned elements, shock losses are obtained at stall, and also during the initial torque conversion stages, i. e. between stall and the coupling point, with minimum shock losses being had at different speed ratios between adjoining exits and entrances, between .4 to .9 speed ratios. Also, at least two of the vaned elements have the entrance portions of their vanes angularly disposed with relation to the adjoining exit portions of the vanes on the other wheels in such a way that the angle of the entrance portions substantially corresponds to the resultant discharge angle of the flow from the adjacent exit portion for smoothly receiving the fluid without substantial shock losses at between .7 and .9 speed ratio.

Fig. 38 is a graph which illustrates test data in the form of curves indicating the characteristics of the torque converter. In Fig. 38, the abscissa shows the speed ratio taken as the turbine speeds in percentages of the pump (or engine) speed. The lines of ordinates on the left side indicate the engine input speed or R. P. M. and the torque ratio of the converter, and the ordinate on the right side indicates the efficiency of the converter and also the engine input torque in foot pounds. At the stall condition of the converter, a torque ratio of approximately 2.25 is obtained at an engine or input speed of 1771 R. P. M., the input torque being 127 foot pounds, the efficiency is zero, and the turbine speed ratio is zero. In the torque conversion stage, the efficiency curve illustrates that the efficiency of the converter rises rapidly from zero value at stall to a maximum value of 90% at the peak and thereafter falls slightly to 89.5% at the coupling point, the input speed rising gradually from 1771 R. P. M. during the torque conversion stage to about 2590 R. P. M. at the coupling point. It will be apparent that the torque converter is particularly characterized by the substantially low engine or input speed required at stall and during the torque conversion stages of the converter, high efficiency, and a generally acceptable torque ratio.

Experiments conducted with the torque converter having vane curvatures and other characteristics defined above disclose that the converter, when connected to internal combustion engines having a range of 100 foot pounds at approximately 1500 R. P. M. at stall to 130 foot pounds at 1768 R. P. M. at stall, will provide a torque ratio range at stall between 2.2:1 and 2.5:1 and will have high efficiency.

Figs. 39 to 61, inclusive, illustrate another example of a torque converter having vanes curved to provide entrance, exit and included angles within the range of angles previously mentioned prior to the description of the torque converter illustrated in Figs. 3 to 38, inclusive. This second torque converter example forms another embodiment of the invention and provides a torque ratio range between 2.0:1 and 2.15:1 at stall, when connected to internal combustion engines having input torques ranging from 140 foot pounds at approximately 1500 R. P. M. at stall to 170 foot pounds about 1700 R. P. M. at stall. In the design of this torque converter, the vane curvatures of the pump and stator differ slightly from those previously described with respect to the first torque converter example, the turbine and its vanes of the two converter examples being identical. The cross-section of this torque converter is identical with that illustrated in Fig. 3, and for this reason, it is believed unnecessary to illustrate the same. This second torque converter example is also designed to be of minimum size, and for this purpose has a maximum diameter of 11″ of the flow path, as indicated at C in Fig. 3.

Referring to Figs. 39 to 49 for a description of the pump and, more particularly, the vane curvatures thereof, Figs. 40 and 41 illustrate the pump comprising an outer shroud or shell 40 and an inner shell or core ring 41 maintained in spaced relation and connected to the outer shell 40 by a plurality of vanes 42 defining flow passages 43. Fig. 41 is an enlarged view of one of the pump vanes shown in Figs. 39 and 40, and Fig. 42 is an edge view thereof, while Fig. 43 illustrates the torus space through which the vanes rotate. The inner and outer borders of the portion of the torus defined by the pump shell 40 and the core ring 41 are indicated at I and O, respectively, in Figs. 40 and 43, and it will be seen that the inner and outer borders, defining the pump portion of the torus or fluid circuit, are identical to those illustrated in Figs. 1 and 3. The space in the torus, through which the pump vane rotates, is identical to that illustrated in Figs. 1 and 3.

Fig. 41 illustrates that each pump vane 42 has an entrance portion Pe and an outlet portion Po, the entrance portion Pe being curved forwardly with respect to the direction of rotation of the pump about its axis, and the discharge portion Po of the pump vane being forwardly bent with respect to the direction of rotation of the pump about its axis, with each vane having a substantially flat intermediate portion Pi. In accordance with the previously described vane angle system, entrance angle $B_1$, outlet angle $B_2$ and other various angles at sections $p$ to $t$, inclusive, in Figs. 43 and 44 are each measured between an axial plane through a point at the particular section on the mean flow line, designated M, and a line tangent to the mean flow line at that point, the entrance angle $B_1$ at section $p$ being $-27°30'$, at section $q$ $-5°$, at section $r$ $-0°45'$, at section $s$ $+5°$, and the outlet angle $B_2$ at section $t$ is $+5°30'$. It will be apparent that these various angles illustrate that the angle $B_1$ of $-27°30'$ at the entrance portion Te of the vane is such that the vane at its entrance portion will tend to direct the flow of the fluid counter to the direction of rotation of the pump relative to the axial plane and will continue to do so until the direction of fluid is changed as it approaches the outlet portion Po of the vane, as the vane angles at section $s$ of the vane and at the outlet portion Po of the vane cause the flow of the fluid to be directed toward the direction of rotation of the pump relative to the axial plane. The included angle $B_3$ is 147°.

Fig. 44 illustrates the true mean flow line, with reference to an axial plane, when the vane is in its rolled out condition, and it will be apparent from this view and Fig. 43 how the various vane angles have been plotted, and also the derivation of the included angle $B_3$ obtained by lines tangent with the mean flow line at the entrance and outlet portions of the vane, the angle through which the fluid is turned being the supplementary angle to the included angle. The dimension "X" identifies an area bounded by parallel planes respectively passing through the inlet and outlet edges of the vanes along the mean flow line M. The "X" dimension is somewhat relative and only shows the general shape of the mean flow line.

Referring to Fig. 41, it will be seen that each pump vane 42 has a scroll of 4°, an inlet bias (IB) of 13°, and an outlet bias (OB) of 8°45'.

The turbine and the curvature design of its vanes, for use with the pump 39, is identical to that illustrated in Figs. 15 to 26, inclusive, and for this reason, it is believed unnecessary to again provide a description thereof.

Figs. 50 and 51 respectively illustrate a side view and an edge view of the stator 44 used in combination with the pump in Figs. 39 to 49, and the turbine shown in Figs. 15 to 26, inclusive. The stator comprises the vanes 45 equally circumferentially spaced about and connected to the substantially concavo-convex annular member or outer shroud 46 and defining, with the overlapping core ring 41 of the pump and the core ring of the turbine, a plurality of channels 47. The formation of the stator vanes 45 are quite similar to the stator vanes of the first torque converter example previously described, the vanes viewed radially of the axis of the stator being warped helix-wise, the entrance portions of the vanes being designated at Se and the fluid discharge or outlet portions being indicated at So, the mean flow line being indicated at M in the various views. Fig. 54 illustrates the torus space through which the stator vanes rotate, the inner border being indicated at I and the outer border being indicated at O. Using the vane angle measurement system previously described, the angle $B_1$ at the entrance portion of the vane and taken at section $u$ in Figs. 54 and 55 is 0°; the angle $B_2$ at the outlet portion of the vane and taken at section $x$ in Figs. 54 and 55 is $+58°$; the angles between the entrance and outlet portions and taken at sections $v$ and $w$ in Figs. 54 and 55 are $+32°$ and $+51°30'$ respectively. The Scroll is identified as being an angle of 27°45' in Fig. 52 and is the angle between the two planes containing the intersection of the mean flow line M and the entering and leaving edges Se and So of the vane when the vane does not lie in one axial plane. The inlet bias angle, indicated at IB in Fig. 52, is 4°15' and the outlet bias angle, indicated at OB in Fig. 52, is 39°15'. Fig. 55 illustrates the mean flow line M on the vane in its rolled out condition and is referred to for measurements of the described vane angles, and the included angle $B_3$ is 122°, it being understood that the angle through which the fluid is turned is a supplementary angle to the included angle. The "X" dimension in Figs. 52 and 55 identifies an area bounded by parallel planes respectively passing through the inlet and outlet edges of the vanes along the mean flow line M.

Each of the pump, turbine and stator channels vary in width and depth at any cross-sectional area thereof but are generally equal in area to allow substantially the same volume of fluid to flow through each channel at the entrance and exit thereof and at any section between the entrance and exit. The vanes of the pump and stator of the present converter, as well as the vanes of the turbine previously described, have been designed that the fluid velocities within each of the vaned elements are substantially equal, with consequent smooth and efficient flow of the fluid at the inner, outer and mean flow lines of the vanes through the individual bladed elements between the inner and outer borders I and O thereof.

Also, to obtain substantially the same energy conversion along each path of fluid stream in the converter profile fluid circuit, the curvatures of the vanes have been changed gradually from the streamline at the inner border I to the streamline at the outer border O, and particularly to provide an entrance angle of $-35\frac{1}{2}$ degrees at the inner streamline of the pump vane which is $12\frac{1}{2}$ degrees larger than the entrance angle of $-23$ degrees at the outer streamline; to provide an entrance angle of $+47$ degrees at the inner streamline of the turbine vane which is 3½ degrees more than the entrance angle of +43½ degrees at the outer streamline; the inner and outer streamline at the entrance portion of the stator vane being in the same plane and, accordingly, these streamlines have no angular inclinations. The exit angle of +5½ degrees at the inner streamline of the pump vane is the same as the exit angle of +5½ degrees at the outer streamline of the pump vane, while the exit angle of −70 degrees at the inner streamline of the turbine vane is 12½ degrees larger than the angle of −57½ degrees at the outer streamline; and the exit angle of +72 degrees at the inner streamline of the stator vane is 17½ degrees larger than the angle of +54½ degrees at the outer streamline. The change in the included angles from the inner streamline to the outer streamline is 12 degrees for the pump vanes, as the included angle of the inner streamline is 139 degrees and the included angle of the outer streamline is 151 degrees. The change in the included angle from the inner streamline to the outer streamline is 16 degrees for the turbine vanes, as the included angle of the inner streamline is 63 degrees and the included angle of the outer streamline is 79 degrees. The change in the included angle from the inner streamline to the outer streamline is 17 degrees for the stator vanes, as the included angle of the inner streamline is 108 degrees and the included angle of the outer streamline is 125 degrees. The included angles formed by tangents to the inner streamline at the entrance and exit is generally 139 degrees for the pump, 63 degrees for the turbine, and 108 degrees for the stator, and the included angles formed by tangents to the outer streamline at the entrance and exit being generally 151 degrees for the pump, 79 degrees for the turbine, and 126 degrees for the stator. It will be seen from an inspection of Figs. 39 and 41, 15 and 17, and 51 and 52 that these changes in the aforesaid angles, and the vane angles particularly described heretofore, will provide vanes having continuously and gradually changing portions conducive to providing smooth flow of the fluid at each streamline in the torus fluid circuit.

The outer border O is defined by the outer pump shroud 40, the outer turbine shroud 22, and the outer stator shroud 46, and the inner border I is defined by the inner pump shroud 41, and the inner turbine shroud 23. Referring to Figs. 39 and 41 for the pump vanes, and Figs. 51 and 52 for the stator vanes, the pump vanes are bounded by the points P1, P2, P3, and P4; P1 and P2 defining the exit edge and P3 and P4 defining the entrance edge. The entrance edge has its inner tip P3 on the inner border I and its outer tip P4 on the outer border O, the outer tip P4 lying in front of the inner tip P3 in relation to the direction of rotation of the pump. The exit edge has its inner tip P2 on the inner border I lying in front of the outer tip P1 in relation to the direction of rotation of the pump.

Referring to Figs. 51 and 52, the entrance and exit edges of each stator vane is bounded by the points S1, S2, S3, and S4. The entrance edge has its inner tip S1 lying ahead of the outer tip S2 in relation to the direction of rotation of the pump and the exit edge has its inner tip S3 lying behind its outer edge S4 in relation to the direction of rotation of the pump. The curvature of the vanes to provide the relationship of the aforesaid outer and inner tips of each of the pump, the previously described turbine and the stator vane exit and entrance edges is effective to equalize the velocity distribution between the inner and outer borders in each of the vaned elements.

Equalization of the velocity distribution between the outer and inner borders in each of the vaned elements is also effected by the angular relationship of the pump, turbine and stator vanes with respect to the outer and inner borders O and I defining the torus portion of the converter. For this purpose and referring first to Figs. 45 to 49, inclusive, illustrating generally various angles $A_1$–$A_5$ of the pressure faces of the pump vanes at different portions thereof, with respect to the inner and outer borders I and O of the pump, each angle represents the angle between the pressure side of the vane and a line tangent to the outer shell through the point of intersection of the pressure side of the vane and the outer shell, as shown in sections $p, q, r, s, t$, in Figs. 43 and 44, which sections are normal to fluid flow. To more particularly describe this relationship of the pressure faces of the pump vanes to the inner and outer borders, the particularly designated cross sections of a pump channel, provided by two adjacent pump vanes and the outer shell and core ring of the pump, are shown in unwrapped form to dispose the inner and outer borders in parallel planes with the vanes assuming resultant angular positions. Referring to Figs. 45 to 49, inclusive, and Figs. 43 and 44, it will be seen that at the entrance portion of the pump channel (section $p$) and the pressure face of each vane makes an angle $A_1$ greater than 90° with the outer shell or, more specifically, about 100°30'; the various cross sections $q, r, s$ of the channel, between the entrance and exit portions of the pump channel, and shown in Figs. 46–49 illustrated that the pressure face of each pump vane makes an angle of less than 90° with the outer shell in Fig. 46 and, more specifically, an angle $A_2$ of about 86°30'; in Fig. 47, an angle of less than 90° with the outer shell or angle $A_3$ of about 81°; and in Fig. 48, an angle of less than 90° with the outer shell, i. e. an angle $A_4$ of approximately 83°. As shown in Fig. 49, the pressure face of each vane, at the exit portion of the pump channel makes an angle of less than 90° with the outer shell or an angle $A_5$ of about 80°, at the cross section of the channel indicated at $t$ in Fig. 43.

Referring to Figs. 54, and 56 to 59, inclusive, it will be seen that at the entrance portion of the stator channel shown in Fig. 56 (section $u$ in Fig. 54) that the pressure face of each stator vane forms an angle $\phi_1$ of generally 83° and that, at mid-sections $v$ and $w$ of the channel shown in Figs. 57 and 58 and disposed between the entrance and exit portions of the channel illustrated in Figs. 56 and 59, the pressure face of each vane at section $v$ forms an angle $\phi_2$ of generally 88°30', and, at the cross section $w$ of the channel, as seen in Fig. 58, the pressure face of each vane forms an angle $\phi_3$ of greater than 90°, or about 109°. The cross section of the exit of the channel, indicated at $x$ in Fig. 54 and illustrated in Fig. 59, shows the pressure face of each stator vane forms an angle $\phi_4$ of greater than 90° with the outer shell, or about 137°.

As previously described, the pressure faces of the turbine vanes form angles, at different cross-sections of the turbine channels, with the outer and inner borders of the turbine, defined by the outer shell and core ring of the turbine, which will equalize the velocities of the fluid along the inner and outer borders of the turbine torus portion of the fluid circuit.

Fig. 60 is a vectorial study of the relative fluid flow angles at stall and during different portions of the torque-converting range and at the coupling point effected by the moving pump, turbine and stationary stator vanes. More particularly, Fig. 60 shows the calculated direction of fluid flow relative to the inlet of each of the vaned elements of the converter from stall to .9 speed ratio, the change in fluid flow direction from stall to .9 speed ratio being the total range given in degrees of arc.

The various calculated angles of fluid flow at the junctions between two adjacent vaned wheels are, as measured with respect to an axial plane, as follows:

|  | Angle of Fluid from Exit of Stator Relative to Pump | Angle of Fluid from Exit of Pump Relative to Turbine | Angle of Fluid from Exit of Turbine Ducts Relative to Stator |
|---|---|---|---|
| Stall | −28°30′ | 74°30′ | −58° |
| .1 Speed Ratio |  | 73° | −55° |
| .2 Speed Ratio |  | 71° | −50° |
| .3 Speed Ratio | −29° | 68° | −46° |
| .4 Speed Ratio | −32° | 66° | −39° |
| .5 Speed Ratio | −37° | 64° | −29° |
| .6 Speed Ratio | −43° | 61° | −13° |
| .7 Speed Ratio | −51° | 56° | +8° |
| .8 Speed Ratio | −63° | 52° | +44° |
| Coupling Point | −73° | 48° | +62° |
| .9 Speed Ratio | −77°30′ | 47°30′ | +72° |

In explanation of the vector flow diagram of Fig. 60 and the foregoing table, it is assumed that the stall condition of the converter occurs when the pump is driven by the engine and the load on the turbine prevents rotation of the turbine by the kinetic energy of the fluid circulated in the converter, these various angles being identified by the designations "Stall," the "Speed Ratio" or "S. R." is the relationship of the turbine and pump speeds and determined by dividing the turbine speed by the pump speed; the "Coupling Point" designates the angular relationships of the flow of the fluid from one vaned element to the other at the time and speed ratio when the reaction member or stator freewheels by the change in the angular direction of the fluid flow from the turbine striking the vanes of the stator to effect rotation of the stator in the direction of rotation of the pump whereby the torque converter acts as a fluid coupling. The total range of the angles of fluid flow from the turbine into the stator is 130°, from the stator into the pump is 49°, and from the pump into the turbine is 27°. It will be noted from an inspection of Fig. 60 and the foregoing table that this 11″ torque converter has high shock losses at stall at the junction of the pump exits and turbine entrances, and also at the junction of the turbine exits and stator entrances due to the angular disposition of the absolute flow angles of the fluid from the pump and turbine exits with respect to the angle of the physical entrance portions of the turbine and stator vanes. These shock losses will become apparent when it is considered that there is an angular difference of 58° indicated at $\theta_2$ between the direction of flow of the fluid from the turbine with respect to the physical entrance portion of the stator vanes at the stall condition of the converter, and that there is an angular difference of 29°30′, indicated at $\theta_1$, between the angle of the flow of the fluid from the impeller with respect to the angle of the physical entrance portion of the turbine at the stall condition of the converter. It may be noted that, at the stall condition of the converter, there is only 1° between the angle of fluid flow from the stator with respect to the angle of the physical entrance portion of the inlet portion of the impeller. More particularly, as the physical entrance portion of the turbine is disposed at an angle $B_1$ of 45° and the direction of the fluid flow from the impeller at stall is 74°30′, shock losses will be had at stall, and it is not until a speed ratio of between .8 and .9 speed ratios is reached when the angle of fluid flow from the impeller becomes the same as the angle of the entrance portions of the turbine vanes and, at such time, the fluid will flow into the turbine entrance portions without hydraulic shock losses.

Referring to the juncture of the exit portions of the turbine vanes and the entrance portions of the stator vanes, it will be seen that at the stall condition of the converter, the angle of fluid flow from the exit portions of the turbine vanes is an angle of −58°, and that the angle of the entrance portions of the stator vanes is 0°, causing shock losses to be had at this time, the junction becoming shockless at between .6 and .7 speed ratios, when the direction of fluid flow from the turbine is parallel to the entrance portions of the stator vanes. Considering the junction of the stator and the impeller, it will be seen that this junction becomes shockless at between stall and .1 speed ratio, the angle of fluid flow from the stator between stall and .1 speed ratio being −27°30′, the angle of the entrance portions of the impeller at such time. From the foregoing, it will be seen that shock losses will be had between at least two of the junctions of adjacent wheels, with the shock losses being minimized at the three junctions at different times during the torque conversion cycle.

Fig. 61 is a graph which illustrates test data in the form of curves indicating the characteristics of the torque converter, shown in Figs. 39 to 60, inclusive. The abscissa in the graph shows the speed ratio taken as turbine wheel speeds in percentages of the pump (or engine) speed. The two lines of ordinates on the left side indicate the torque ratio of the converter and the engine input speed (R. P. M.), and the two ordinates on the right side indicate the engine input torque in foot pounds and the efficiency of the torque converter.

It will be seen at the stall condition of the torque converter, a torque ratio of approximately 2.03:1 is obtained at engine or input speed of 1698 R. P. M., the engine input torque being 163.5 foot pounds, the efficiency being zero, and the turbine speed ratio being zero. In the torque conversion range, the efficiency curve illustrates that the efficiency of the converter rises rapidly from zero value at stall to a maximum value at 91% at its peak, the efficiency thereafter falling only slightly to 89% at the coupling point and thereafter sharply rising, the engine input speed dropping gradually from 1698 R. P. M. at stall and slowly rising to the same value at approximately .75 speed ratio and then rising rather sharply to 2580 R. P. M. at the coupling point. It will be seen that the torque ratio decreases in a straight line to the coupling point at about .89 speed ratio.

The pump, turbine and stator vanes are formed of thin stamped sheet metal to permit a large number of vanes to be used. This is desirable in hydraulic torque converters, as the converters will supply more torque for a given diameter and speed than torque converters utilizing fewer vanes having airfoil shapes and of varying thicknesses, the larger number of vanes in a torque converter embodying the invention permitting the converter to develop practically all of its theoretical maximum head, while a torque converter limited to fewer vanes, such as airfoil vanes, can only obtain a theoretical maximum head of 85% to 92%. Furthermore, by utilizing vanes of stamped sheet metal, the vanes can be more closely spaced for effectively guiding the fluid and increasing the capacity of the hydraulic torque converter. For this purpose and although the two specifically described torque converters, embodying the invention, each have 31 pump vanes, 27 turbine vanes and 12 stator vanes, each torque converter may have its pump provided with 30 to 40 vanes, the turbine with 25 to 35 vanes, and the stator with 10 to 25 vanes.

It will be apparent from the foregoing description and reference to the drawings that hydraulic torque converters having a pump, turbine and stator with vanes provided with curvatures coming within the general range of vane entrance, exit and included angles described and, as exemplified by the two specifically described torque converters, have satisfactory and commercially acceptable torque ratios, optimum efficiency and characterized by torque ratios at stall being obtained at low engine input speeds demanded by automobile manufacturers, while the converters are of a practicably minimum size of eleven inches (11") and thereby particularly adapted for use in automotive vehicles having limited transmission space accommodations.

We claim:

1. A hydraulic torque converter comprising a vaned pump, a vaned turbine, and a vaned stator arranged to form a closed fluid circuit in which the pump vane exits and turbine vane entrances are at substantially the largest circuit radius and the stator is at substantially the smallest circuit radius, said vanes having curvatures providing entrance and exit angles, the entrance angle of each pump vane being between −5 to −35 degrees, of each turbine vane being between +25 to +49 degrees, and of each stator vane being between −15 to +5 degrees, the entrance angle for each vane of the pump, turbine, and stator being measured between an axial plane extending through the intersection of the entrance edge of the vane and the mean flow line on the pressure face of the vane and through a line tangent to the mean flow line at the entrance edge of the vane, the exit angle of each pump vane being between −20 to +30 degrees, of each turbine vane being between −50 to −70 degrees, and of each stator vane being between +45 to +75 degrees, the exit angle for each vane of the pump, turbine, and stator being measured between an axial plane extending through the intersection of the exit edge of the vane and the mean flow line on the pressure face of the vane and through a line tangent to the mean flow line at the exit edge of the vane, an angle being positive when the angle is such that the vane tends to direct the fluid flow toward the direction of rotation of the converter relative to the axial plane, and an angle being negative when the angle is such that the vane tends to direct the fluid flow counter to the direction of rotation of the converter relative to the axial plane.

2. A torque converter as set forth in claim 1 in which the curvature of the vanes changes gradually along the middle streamline, the change of the included angles, formed by tangents to the middle streamline at the entrance and exit, being from 115 to 195 degrees for the pump vanes, from 61 to 105 degrees for the turbine vanes, and from 90 to 140 degrees for the stator vanes.

3. A hydraulic torque converter as set forth in claim 1, wherein the pump has from 30 to 40 vanes, the turbine from 25 to 35 vanes, and the stator from 10 to 25 vanes.

4. A hydraulic torque converter comprising a vaned pump, a vaned turbine, and a vaned stator arranged to form a closed fluid circuit in which the pump vane exits and turbine vane entrances are at substantially the largest circuit radius and the stator is at substantially the smallest circuit radius, said vanes having curvatures providing entrance and exit angles, the entrance angle of each pump vane being in a range from −23 to −30 degrees, of each turbine vane being in a range from +43 to +49 degrees, and of each stator vane being in a range from −3 to +3 degrees, when the entrance angle for each vane of the pump, turbine, and stator is measured between an axial plane extending through the intersection of the entrance edge of the vane and the mean flow line on the pressure face of the vane and a line tangent to the mean flow line at the entrance edge of the vane, the exit angle of each pump vane being in a range from −5 to −13 degrees, of each turbine vane being in a range from −53 to −60 degrees, and of each stator vane being in a range from +64 to and including +75 degrees, the exit angle for each vane of the pump, turbine, and stator being measured between an axial plane extending through the intersection of the exit edge of the vane and the mean flow line on the pressure face of the vane and a line tangent to the mean flow line at the exit edge of the vane, an angle being positive when the angle is such that the vane tends to direct the fluid flow toward the direction of rotation of the converter relative to the axial plane, and an angle being negative when the angle is such that the vane tends to direct the fluid flow counter to the direction of rotation of the converter relative to the axial plane.

5. A torque converter as set forth in claim 4 in which the curvature of the vanes changes gradually along the middle streamline, the included angles, formed by tangents to the middle streamline at the entrance and exit, being in a range from 161 to 167 degrees for the pump vanes, in a range from 74 to 80 degrees for the turbine vanes, and in a range from 105 to 115 degrees for the stator vanes.

6. A hydraulic torque converter as set forth in claim 4 wherein each pump vane has an inlet bias angle in a range from 8 to 14 degrees, an outlet bias angle in a range from 13 to 19 degrees, and a scroll angle in a range from 6 to 12 degrees; each turbine vane has an inlet bias angle in a range from 16 to 22 degrees, an outlet bias angle in a range from 23 to 29 degrees, and a scroll angle in a range from 0 to 3 degrees; and each stator vane has an inlet bias angle in a range from 2 to 8 degrees, an outlet bias angle in a range from 43 to 50 degrees, and a scroll angle in a range from 31 to 37 degrees.

7. A hydraulic torque converter as set forth in claim 4, wherein the pump has 31 vanes, the turbine has 27 vanes, and the stator has 12 vanes.

8. A hydraulic torque converter comprising a vaned pump, a vaned turbine, and a vaned reaction member arranged to form a closed fluid circuit in which pump vane exits and turbine vane entrances are at substantially the largest circuit radius and the reaction member is at substantially the smallest circuit radius, the vanes having curvatures providing, along the middle streamline, entrance angles for the pump between —5 and —35 degrees, for the turbine between +25 and +49 degrees, for the reaction member between —15 and +5 degrees, the exit angles of the vanes in the pump being between —20 and +30 degrees and for the turbine between —50 and —70 degrees and for the reaction member between +45 and +75 degrees, the curvature of the vanes changing gradually from the inner to the outer streamline, the difference between the entrance angle on the inner streamline and the entrance angle on the outer streamline ranging between 0 to 23½ degrees for the pump vanes, for the turbine vanes and for the reaction member vanes, the difference between the exit angle on the inner streamline and the exit angle on the outer streamline ranging between 0 and 17½ degrees for the pump vanes, for the turbine vanes and the reaction member vanes, each entrance and exit angle for each vane of the pump, turbine, and reaction member being measured between an axial plane extending through the intersection of the respective entrance or exit edge of the vane and the particular streamline on the pressure face of the vane and a line tangent to the particular streamline of the respective entrance or exit edge of the vane, the angle being positive when the angle is such that the vane tends to direct the fluid flow toward the direction of rotation of the converter relative to the axial plane, and the angle being negative when the angle is such that the vane tends to direct the fluid flow counter to the direction of rotation of the converter relative to the axial plane.

9. A hydraulic torque converter comprising a vaned pump member, a vaned turbine member, and a vaned stator member, said members being arranged to form a closed fluid circuit in which the pump member vane exits and turbine vane entrances are at substantially the largest circuit radius and the stator member is at substantially the smallest circuit radius, each of said members defining flow channels of substantially parallelogram section between the vanes thereof and the inner and outer contour walls thereof, the pump member vanes being warped in such a way that the pressure face of each vane varies from an angle greater than 90 degrees with the outer contour wall at the entrance portion of the vane to an angle of less than 90 degrees with the outer contour wall at the exit portion of the vane, the turbine member vanes being warped in such a way that the pressure face of each vane varies from an angle greater than 90 degrees with the outer contour wall at the entrance portion of the vane to an angle less than 90 degrees with the outer contour wall at an intermediate portion of the vane to an angle greater than 90 degrees at the exit portion of the vane; and the stator member vanes being warped in such a way that the pressure face of each vane varies from an angle less than 90 degrees with the outer contour wall at the entrance portion of the vane to an angle greater than 90 degrees with the outer contour wall at the exit portion of the vane.

10. A hydraulic torque converter comprising a vaned pump member, a vaned turbine member, and a vaned stator member, each of said members defining flow channels of substantially parallelogram section between the vanes thereof and the inner and outer contour walls thereof, the pump member vanes being warped in such a way that the pressure face of each vane varies from an angle between 90 to 96 degrees with the outer contour wall at the entrance portion of the vane to an angle between 72 to 78 degrees with the outer contour wall at the exit portion of the vane; the turbine member vanes being warped in such a way that the pressure face of each vane varies from an angle between 105 to 111 degrees with the outer contour wall at the entrance portion of the vane to an angle between 72 and 78 degrees with the outer contour wall at the intermediate portion of the vane to an angle between 102 and 108 degrees at the exit portion of the vane; the stator member vanes being warped in such a way that the pressure face of each vane varies from an angle between 80 and 86 degrees with the outer contour wall at the entrance portion of the vane to an angle between 149 and 155 degrees with the outer contour wall at the exit portion of the vane.

11. A hydraulic torque converter comprising rotatable vaned pump and turbine elements, and a stationary vaned stator element, said elements being arranged to form a substantially toroidal fluid circuit having inner and outer shroud members and in which the pump element vane exit edges and turbine element vane entrance edges are at substantially the largest circuit radius and the stator element vanes being disposed between the turbine element vane exit edges and pump element entrance edges at substantially the smallest circuit radius, the vanes of each of said elements terminating so that each pump element vane has its entrance edge outer tip, adjacent to the outer pump element shroud member, lying ahead of its entrance edge inner tip, adjacent to the inner pump element shroud member, in relation to the direction of rotation of the pump element, and its exit edge inner tip, adjacent to the inner pump element shroud member, lying ahead of its exit edge outer tip, adjacent to the outer pump element shroud member, in relation to the direction of rotation of the pump element; each turbine element vane has its entrance edge outer tip, adjacent to the outer turbine element shroud member, lying behind its entrance edge inner tip, adjacent to the inner turbine element shroud member, in relation to the direction of rotation of the turbine element, and its exit edge outer tip, adjacent to the outer turbine element shroud member, lying behind its exit edge inner tip, adjacent to the inner turbine element shroud member, in relation to the direction of rotation of the turbine element; and each stator element vane having its entrance edge outer tip, adjacent to the outer stator element shroud member, lying behind its entrance edge inner tip, adjacent to the inner pump element shroud member, and its exit edge outer tip, adjacent to the outer stator element shroud member, lying ahead of the exit edge inner tip, adjacent to the inner turbine element shroud member, in relation to the direction of rotation of the pump element.

12. A hydraulic torque converter comprising a vaned pump, a vaned turbine, and a vaned stator arranged to form a closed fluid circuit in which the pump vane exits and turbine vane entrances are at substantially the largest circuit radius and the stator is at substantially the smallest circuit radius, said vanes having curvatures providing entrance and exit angles, the entrance angle of each pump vane being in a range from −23 to −30 degrees, of each turbine vane being in a range from +43 to +49 degrees, and of each stator vane being in a range from −3 to +3 degrees when the entrance angle for each vane of the pump, turbine, and stator is measured between an axial plane extending through the intersection of the entrance edge of the vane and the mean flow line on the pressure face of the vane and a line tangent to the mean flow line at the entrance edge of the vane, the exit angle of each pump vane being in a range from +2 and +8 degrees, of each turbine vane being in a range from −53 to −60 degrees, and of each stator vane being in a range from +57 to +65 degrees, the exit angle for each vane of the pump, turbine, and stator being measured between an axial plane extending through the intersection of the exit edge of the vane and the mean flow line on the pressure face of the vane and a line tangent to the mean flow line at the exit edge of the vane, an angle being positive when the angle is such that the vane tends to direct the fluid flow toward the direction of rotation of the converter relative to the axial plane, and an angle being negative when the angle is such that the vane tends to direct the fluid flow counter to the direction of rotation of the converter relative to the axial plane.

13. A torque converter as set forth in claim 12 in which the curvature of the vanes changes gradually along the middle streamline, the included angles, formed by tangents to the middle streamline at the entrance and exit, being in a range from 144 to 150 degrees for the pump vanes, in a range from 74 to 80 degrees for the turbine vanes, and in a range from 115 to 124 degrees for the stator vanes.

14. A hydraulic torque converter as set forth in claim 12 wherein each pump vane has an inlet bias angle from 7 to 13 degrees, an outlet bias angle from 9 to 14 degrees, and a scroll angle from 1 to 7 degrees; each turbine vane has an inlet bias angle from 16 to 21 degrees, an outlet bias angle from 23 to 29 degrees, and a scroll angle from 0 to 3 degrees; and each stator vane has an inlet bias angle from 1 to 7 degrees, an outlet bias angle from 36 to 42 degrees, and a scroll angle from 25 to 31 degrees.

15. A hydraulic torque converter as defined in claim 12 wherein the curvature of the vanes, provides entrance angles along the inner streamline in a range from −32 to −38 degrees for the pump, in a range from +43 to +49 degrees for the turbine, and in a range from −3 to +3 degrees for the stator, the exit angles along the inner streamline being in a range from +2 to +8 degrees for the pump, in a range from −67 to −73 degrees for the turbine, and in a range from +68 to +74 degrees for the stator, and the entrance angles along the outer streamline being in a range from −20 to −27 degrees for the pump, in a range between +43 to +51 degrees for the turbine, and in a range from +3 to −3 degrees for the stator, the exit angles along the outer streamline being in a range from +3 to +7 degrees for the pump, in a range from −54 to −59 degrees for the turbine, and in a range from +52 to +57 degrees for the stator.

16. A hydraulic torque converter as defined in claim 12 wherein the curvature of the vanes, provides entrance angles along the inner streamline in a range from −32 to −38 degrees for the pump, in a range from +43 to +49 degrees for the turbine, and in a range from −3 to +3 degrees for the stator, the exit angles along the inner streamline being in a range from +2 to +8 degrees for the pump, in a range from −67 to −73 degrees for the turbine, and in a range from +68 to +74 degrees for the stator, and the entrance angles along the outer streamline being in a range from −20 to −27 degrees for the pump, in a range between +43 to +51 degrees for the turbine, and in a range from +3 to −3 degrees for the stator, the exit angles along the outer streamline being in a range from +3 to +7 degrees for the pump, in a range from −54 to −59 degrees for the turbine, and in a range from +52 to +57 degrees for the stator, the included angles formed by tangents to the inner streamline at the entrance and exit being in a range from 137 to 141 degrees for the pump, in a range from 61 to 69 degrees for the turbine, and in a range from 107 to 112 degrees for the stator, and the included angles formed by tangents to the outer streamline at the entrance and exit being in a range from 148 to 153 degrees for the pump, in a range from 72 to 81 degrees for the turbine, and in a range from 122 to 127 degrees for the stator.

17. A hydraulic torque converter comprising a vaned pump member, a vaned turbine member, and a vaned stator member, each of said members defining flow channels of substantially parallelogram section between the vanes thereof and the inner and outer contour walls thereof, the pump member vanes being warped in such a way that the pressure face of each vane varies from an angle in a range from 97 to 103 degrees with the outer contour wall at the entrance portion of the vane to an angle in a range from 77 to 83 degrees with the outer contour wall at the exit portion of the vane; the turbine member vanes being warped in such a way that the pressure face of each vane varies from an angle in a range from 105 to 111 degrees with the outer contour wall at the entrance portion of the vane to an angle in a range from 72 to 78 degrees with the outer contour wall at the intermediate portion of the vane to an angle in a range from 102 to 108 degrees at the exit portion of the vane; the stator member vanes being warped in such a way that the pressure face of each vane varies from an angle in a range from 80 to 86 degrees with the outer contour wall at the entrance portion of the vane to an angle in a range from 127 to 138 degrees with the outer contour wall at the exit portion of the vane.

18. A hydraulic torque converter comprising a passage for fluid including rotary driving and driven vaned elements, and a vaned stationary stator element, the driving, driven and stator elements being coaxial and juxtaposed and forming a circuit in which the fluid is circulating and transmitting power said elements being arranged to form a closed fluid circuit in which the pump element vane exits and turbine element vane entrances are at substantially the largest circuit radius and the stator element is at substantially the smallest circuit radius, the adjacent exit and entrance portions of respective vanes being related to provide substantial differences in the direction of fluid flow from one element to the adjacent element during fluid circulation at stall or when the turbine element is moving slowly, due to the difference from 26 to 32 degrees between the pump element vaned exit and the turbine element vaned inlet, the difference of from 25 to 31 degrees between the stator element vaned exit and the pump element vaned inlet, the difference from 55 to 61 degrees between the turbine element vaned exit and the stator element vaned entrance, the angles being measured between the relative flow angle of the fluid from one vaned element with respect to the angle of the physical entrance portions of the vanes of the adjacent vaned element, the fluid flow from each element being at the same angle as the angle of the physical entrance portions of the vanes of the element into which the fluid flows at different speed ratios of the converter.

19. A hydraulic torque converter comprising a passage for fluid including rotary driving and driven vaned elements, and a vaned stationary stator element, the driving, driven and stator elements being coaxial and juxtaposed and forming a circuit in which the fluid is circulating and transmitting power said elements being arranged to form a closed fluid circuit in which the pump element vane exits and turbine element vane entrances are at substantially the largest circuit radius and the stator element is at substantially the smallest circuit radius, the adjacent exit and entrance portions of respective vanes being related to provide substantial differences in the direction of fluid flow from one element to the adjacent element during fluid circulation at stall or when the turbine element is moving slowly, due to the difference from 26 to 32 degrees between the pump element vaned exit and the turbine element vaned inlet, the difference from 25 to 31 degrees between the stator element vaned exit and the pump element vaned inlet, the difference from 55 to 61 degrees between the turbine element vaned exit and the stator element vaned entrance, the angles being measured between the relative flow angle of the fluid from one vaned element with respect to the angle of the physical entrance portions of the vanes of the adjacent vaned element, the fluid flow from each element being at the same angle as the angle of the physical entrance portions of the vanes of the element into which the fluids flows at between .5 and .9 speed ratios of the converter.

20. A hydraulic torque converter as defined in claim 4 wherein the curvature of the vanes, provides entrance angles along the inner streamline in a range from −24 to −31 degrees for the pump, in a range from +43 to +49 degrees for the turbine, and in a range from −3 to +3 degrees for the stator, the exit angles along the inner streamline being in a range from −6 to −12 degrees for the pump, in a range from −67 to −73 degrees for the turbine, and in a range from +71 to +79 degrees for the stator, and the entrance angles along the outer streamline being in a range from −22 to −28 degrees for the pump, in a range from +43 to +51 degrees for the turbine, and in a range from −3 to +3 degrees for the stator, and the exit angles along the outer streamline being in a range from −6 to −12 degrees for the pump, from −54 to −60 degrees for the turbine, and in a range from +62 to +68 degrees for the stator.

21. A hydraulic torque converter as defined in claim 4 wherein the curvature of the vanes, provides entrance angles along the inner streamline in a range from −24 to −31 degrees for the pump, in a range from +43 to +49 degrees for the turbine, and in a range from −3 to +3 degrees for the stator, the exit angles along the inner streamline being in a range from −6 to −12 degrees for the pump, in a range from −67 to −73 degrees for the turbine, and in a range from +71 to +79 degrees for the stator, and the entrance angles along the outer streamline being in a range from −22 to −28 degrees for the pump, in a range from +43 to +51 degrees for the turbine, and in a range from −3 to +3 degrees for the stator, and the exit angles along the outer streamline being in a range from −6 to −12 degrees for the pump, in a range from −54 to −60 degrees for the turbine, and in a range from +62 to +68 degrees for the stator, the included angles formed by tangents to the inner streamline at the entrance and exit being in a range from 159 to 166 degrees for the pump, in a range from 61 to 69 degrees for the turbine, and in a range from 101 to 107 degrees for the stator, and the included angles formed by tangents to the outer streamline at the entrance and exit being in a range from 161 to 167 degrees for the pump, in a range from 72 to 81 degrees for the turbine, and in a range from 112 to 118 degrees for the stator.

22. A hydraulic torque converter as defined in claim 1 wherein the curvature of the vanes changing gradually along the middle streamline, the change of the included angles, formed by tangents to the middle streamline at the entrance and exit, being from 115 to 195 degrees for the pump vanes, from 61 to 105 degrees for the turbine vanes, and from 90 to 140 degrees for the stator vanes, the curvature of the vanes changing gradually from the inner to the outer streamline, the difference between the entrance angle on the inner streamline and the entrance angle on the outer streamline ranging between 0 to 23½ degrees for the pump vanes, for the turbine vanes, and for the reaction member vanes, the difference between the exit angle on the inner streamline and the exit angle on the outer streamline ranging between 0 to 17½ degrees for the pump vanes, for the turbine vanes and the reaction member vanes, each entrance and exit angle for each vane of the pump, turbine, and reaction member being measured between an axial plane extending through the intersection of the respective entrance or exit edge of the vane and the particular streamline on the pressure face of the vane and through a line tangent to the particular streamline at the respective entrance or exit edge of the vane, the angle being positive when the angle is such that the vane tends to direct the fluid flow toward the direction of rotation of the converter relative to the axial plane, and the angle being negative when the angle is such that the vane tends to direct the fluid flow counter to the direction of rotation of the converter relative to the axial plane.

REINHOLD C. ZEIDLER.
WILLIAM A. BARNES.

References Cited in the file of this patent

UNITED STATES PATENTS

| Number | Name | Date |
|---|---|---|
| 2,306,758 | Schneider et al. | Dec. 29, 1942 |
| 2,381,187 | Swift | Aug. 7, 1945 |
| 2,410,185 | Schneider et al. | Oct. 29, 1946 |

FOREIGN PATENTS

| Number | Country | Date |
|---|---|---|
| 414,500 | Great Britain | Aug. 9, 1934 |